United States Patent
Meirav et al.

(10) Patent No.: US 9,939,163 B2
(45) Date of Patent: *Apr. 10, 2018

(54) SYSTEMS AND METHODS FOR AIR-CONDITIONING SYSTEMS WITH SCRUBBING SYSTEMS INCLUDING A SCRUBBING BYPASS MODE

(71) Applicant: ENVERID SYSTEMS, INC., Needham, MA (US)

(72) Inventors: Udi Meirav, Newton, MA (US); Israel Biran, Avihail (IL); Asael Meruham, Beit-Dagan (IL)

(73) Assignee: ENVERID SYSTEMS, INC., Needham, MA (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/085,979

(22) Filed: Mar. 30, 2016

(65) Prior Publication Data

US 2016/0282001 A1  Sep. 29, 2016

Related U.S. Application Data

(63) Continuation of application No. 13/738,737, filed on Jan. 10, 2013, now Pat. No. 9,328,936.
(Continued)

(51) Int. Cl.
*F24F 3/16* (2006.01)
*F24F 11/00* (2018.01)
*G05B 15/02* (2006.01)

(52) U.S. Cl.
CPC ........ *F24F 3/1603* (2013.01); *F24F 11/0001* (2013.01); *F24F 11/0012* (2013.01);
(Continued)

(58) Field of Classification Search
None
See application file for complete search history.

(56) References Cited

U.S. PATENT DOCUMENTS 1,522,480 A   1/1925  Allen
1,836,301 A   12/1931 Bechtold
(Continued)

FOREIGN PATENT DOCUMENTS

CA   2640152 A1   4/2010
CN   2141873 Y    9/1993
(Continued)

OTHER PUBLICATIONS

Gesser, H.D., "The Reduction of Indoor Formaldehyde Gas and that Emanating from Urea Formaldehyde Foam Insulation (UFFI)", Environmental International, vol. 10, pp. 305-308, 1984.
(Continued)

*Primary Examiner* — Mohammad Ali
*Assistant Examiner* — Bernard G Lindsay
(74) *Attorney, Agent, or Firm* — Cooley LLP

(57) ABSTRACT

Methods and systems for a heating, ventilation, and air-conditioning (HVAC) system for an enclosed environment may be configured to at least one of heat and cool air and include an air circulation system configured to circulate air at least within the enclosed environment. The air within the enclosed environment may comprise at least the indoor air. The system may further include an outdoor air inlet for introducing at least a portion of outdoor air into the enclosed environment, where the outdoor air comprises air from outside the enclosed environment. The system may further include a scrubbing system having an adsorbent material to reduce presence of at least one gas contaminant in the indoor
(Continued)

air. A controller system may be included for controlling the operation of at least one of the circulation system and the scrubbing system.

9 Claims, 14 Drawing Sheets

Related U.S. Application Data

(60) Provisional application No. 61/650,204, filed on May 22, 2012, provisional application No. 61/585,201, filed on Jan. 10, 2012.

(52) U.S. Cl.
CPC ...... *F24F 11/0015* (2013.01); *F24F 11/0017* (2013.01); *F24F 11/0034* (2013.01); *G05B 15/02* (2013.01); *F24F 2003/1614* (2013.01); *F24F 2003/1617* (2013.01); *F24F 2011/0002* (2013.01); *F24F 2011/0013* (2013.01); *F24F 2011/0016* (2013.01); *F24F 2011/0026* (2013.01); *F24F 2011/0032* (2013.01); *F24F 2011/0064* (2013.01); *F24F 2011/0075* (2013.01); *Y02B 30/78* (2013.01)

(56) References Cited

U.S. PATENT DOCUMENTS

| | | |
|---|---|---|
| 3,107,641 A | 10/1963 | Haynes |
| 3,511,595 A | 5/1970 | Fuchs |
| 3,619,130 A | 11/1971 | Ventriglio et al. |
| 3,702,049 A | 11/1972 | Morris, Jr. |
| 3,751,848 A | 8/1973 | Ahlstrand |
| 3,808,773 A | 5/1974 | Reyhing et al. |
| 3,885,928 A | 5/1975 | Wu |
| 4,182,743 A | 1/1980 | Rainer et al. |
| 4,228,197 A | 10/1980 | Means |
| 4,249,915 A | 2/1981 | Sircar et al. |
| 4,292,059 A | 9/1981 | Kovach |
| 4,322,394 A | 3/1982 | Mezey et al. |
| 4,325,921 A | 4/1982 | Aiken et al. |
| 4,433,981 A | 2/1984 | Slaugh et al. |
| 4,451,435 A | 5/1984 | Holter et al. |
| 4,530,817 A | 7/1985 | Hölter et al. |
| 4,551,304 A | 11/1985 | Holter et al. |
| 4,559,066 A | 12/1985 | Hunter et al. |
| 4,711,645 A | 12/1987 | Kumar |
| 4,810,266 A | 3/1989 | Zinnen et al. |
| 4,892,719 A | 1/1990 | Gesser |
| 4,917,862 A | 4/1990 | Kraw et al. |
| 4,987,952 A | 1/1991 | Beal et al. |
| 5,046,319 A | 9/1991 | Jones |
| 5,087,597 A | 2/1992 | Leal et al. |
| 5,137,548 A | 8/1992 | Grenier et al. |
| 5,186,903 A | 2/1993 | Cornwell |
| 5,221,520 A | 6/1993 | Cornwell |
| 5,231,063 A | 7/1993 | Fukumoto et al. |
| 5,281,254 A | 1/1994 | Birbara et al. |
| 5,290,345 A | 3/1994 | Osendorf et al. |
| 5,292,280 A | 3/1994 | Janu et al. |
| 5,322,473 A | 6/1994 | Hofstra et al. |
| 5,352,274 A | 10/1994 | Blakley |
| 5,376,614 A | 12/1994 | Birbara et al. |
| 5,389,120 A | 2/1995 | Sewell et al. |
| 5,464,369 A | 11/1995 | Federspiel |
| 5,492,683 A | 2/1996 | Birbara et al. |
| 5,584,916 A | 12/1996 | Yamashita et al. |
| 5,675,979 A | 10/1997 | Shah |
| 5,707,005 A | 1/1998 | Kettler et al. |
| 5,827,355 A | 10/1998 | Wilson |
| 5,869,323 A | 2/1999 | Horn |
| 5,876,488 A | 3/1999 | Birbara et al. |
| 5,948,355 A | 9/1999 | Fujishima et al. |
| 5,964,927 A | 10/1999 | Graham et al. |
| 5,984,198 A | 11/1999 | Bennett et al. |
| 6,027,550 A | 2/2000 | Vickery |
| 6,102,793 A | 8/2000 | Hansen |
| 6,113,674 A | 9/2000 | Graham et al. |
| 6,123,617 A | 9/2000 | Johnson |
| 6,187,596 B1 | 2/2001 | Dallas et al. |
| 6,280,691 B1 | 8/2001 | Homeyer et al. |
| 6,364,938 B1 | 4/2002 | Birbara et al. |
| 6,432,367 B1 | 8/2002 | Munk |
| 6,533,847 B2 | 3/2003 | Seguin et al. |
| 6,547,854 B1 | 4/2003 | Gray et al. |
| 6,605,132 B2 | 8/2003 | Fielding |
| 6,623,550 B2 | 9/2003 | Shah et al. |
| 6,711,470 B1 | 3/2004 | Hartenstein et al. |
| 6,726,558 B1 | 4/2004 | Meirav |
| 6,773,477 B2 | 8/2004 | Lindsay |
| 6,796,896 B2 | 9/2004 | Laiti |
| 6,797,246 B2 | 9/2004 | Hopkins |
| 6,866,701 B2 | 3/2005 | Meirav |
| 6,908,497 B1 | 6/2005 | Sirwardane |
| 6,916,239 B2 | 7/2005 | Siddaramanna et al. |
| 6,916,360 B2 | 7/2005 | Seguin et al. |
| 6,930,193 B2 | 8/2005 | Yaghi et al. |
| 6,974,496 B2 | 12/2005 | Wegeng et al. |
| 7,288,136 B1 | 10/2007 | Gray et al. |
| 7,407,533 B2 | 8/2008 | Steins |
| 7,407,633 B2 | 8/2008 | Potember et al. |
| 7,449,053 B2 | 11/2008 | Hallam |
| 7,472,554 B2 | 1/2009 | Vosburgh |
| 7,645,323 B2 | 1/2010 | Massenbauer-Strafe et al. |
| 7,662,746 B2 | 2/2010 | Yaghi et al. |
| 7,666,077 B1 | 2/2010 | Thelen |
| 7,802,443 B2 | 9/2010 | Wetzel |
| 7,891,573 B2 | 2/2011 | Finkam et al. |
| 8,157,892 B2 | 4/2012 | Meirav |
| 8,317,890 B2 | 11/2012 | Raether et al. |
| 8,491,710 B2 | 7/2013 | Meirav |
| 9,328,936 B2 * | 5/2016 | Meirav ............... F24F 11/0001 |
| 2001/0021363 A1 | 9/2001 | Poles et al. |
| 2002/0056373 A1 | 5/2002 | Fielding |
| 2002/0078828 A1 | 6/2002 | Kishkovich et al. |
| 2002/0083833 A1 | 7/2002 | Nalette et al. |
| 2002/0147109 A1 | 10/2002 | Branover et al. |
| 2002/0183201 A1 | 12/2002 | Barnwell et al. |
| 2002/0193064 A1 | 12/2002 | Michalakos et al. |
| 2003/0097086 A1 | 5/2003 | Gura |
| 2003/0188745 A1 | 10/2003 | Deas |
| 2004/0005252 A1 | 1/2004 | Siess |
| 2004/0069144 A1 | 4/2004 | Wegeng et al. |
| 2004/0118287 A1 | 6/2004 | Jaffe et al. |
| 2005/0147530 A1* | 7/2005 | Kang ................ B01D 53/0454 |
| | | 422/400 |
| 2005/0191219 A1 | 9/2005 | Uslenghi et al. |
| 2005/0262869 A1 | 12/2005 | Tongu et al. |
| 2005/0284291 A1 | 12/2005 | Alizadeh-Khiavi et al. |
| 2006/0032241 A1 | 2/2006 | Gontcharov et al. |
| 2006/0054023 A1 | 3/2006 | Raetz et al. |
| 2006/0079172 A1 | 4/2006 | Fleming et al. |
| 2006/0148642 A1 | 7/2006 | Ryu et al. |
| 2006/0249019 A1 | 11/2006 | Roychoudhury et al. |
| 2008/0119356 A1 | 3/2008 | Ryu et al. |
| 2008/0078289 A1 | 4/2008 | Sergi et al. |
| 2008/0127821 A1 | 6/2008 | Noack et al. |
| 2008/0135060 A1 | 6/2008 | Kuo et al. |
| 2008/0182506 A1 | 7/2008 | Jackson et al. |
| 2008/0210768 A1 | 9/2008 | You |
| 2008/0293976 A1 | 11/2008 | Olah et al. |
| 2009/0000621 A1 | 1/2009 | Haggblom et al. |
| 2009/0220388 A1 | 3/2009 | Monzyk et al. |
| 2009/0120288 A1 | 5/2009 | Lackner et al. |
| 2009/0260372 A1 | 10/2009 | Skinner et al. |
| 2010/0076605 A1 | 3/2010 | Harrod et al. |
| 2010/0154636 A1 | 6/2010 | Liu et al. |
| 2010/0254868 A1 | 10/2010 | Obee et al. |
| 2010/0262298 A1 | 10/2010 | Johnson et al. |
| 2010/0278711 A1 | 11/2010 | Find |
| 2011/0064607 A1 | 3/2011 | Hedman |
| 2011/0079143 A1 | 4/2011 | Marotta et al. |

(56) References Cited

U.S. PATENT DOCUMENTS

| | | |
|---|---|---|
| 2011/0085933 A1 | 4/2011 | Mazyck et al. |
| 2011/0146494 A1 | 6/2011 | Desai et al. |
| 2011/0179948 A1 | 7/2011 | Choi et al. |
| 2011/0189075 A1 | 8/2011 | Wright et al. |
| 2011/0192172 A1 | 8/2011 | Delacruz |
| 2011/0198055 A1 | 8/2011 | Meirav et al. |
| 2011/0206572 A1 | 8/2011 | McKenna et al. |
| 2011/0250121 A1 | 10/2011 | Schmidt |
| 2011/0262327 A1 | 10/2011 | Dillon et al. |
| 2011/0265648 A1 | 11/2011 | Meirav |
| 2011/0269919 A1 | 11/2011 | Min et al. |
| 2011/0277490 A1 | 11/2011 | Meirav |
| 2011/0296872 A1 | 12/2011 | Eisenberger |
| 2012/0004092 A1 | 1/2012 | Raatschen et al. |
| 2012/0012005 A1 | 1/2012 | Burke |
| 2012/0052786 A1 | 3/2012 | Clawsey |
| 2012/0076711 A1 | 3/2012 | Gebald et al. |
| 2012/0129267 A1 | 5/2012 | Daly |
| 2012/0148858 A1 | 6/2012 | Wu |
| 2012/0168113 A1 | 7/2012 | Karamanos |
| 2012/0216676 A1 | 8/2012 | Addiego et al. |
| 2012/0222500 A1 | 9/2012 | Riess et al. |
| 2013/0052113 A1 | 2/2013 | Molins et al. |

FOREIGN PATENT DOCUMENTS

| | | |
|---|---|---|
| CN | 101072620 A | 11/2007 |
| CN | 101500704 A | 8/2009 |
| CN | 201363833 Y | 12/2009 |
| EP | 0475493 A2 | 3/1992 |
| ES | 2387791 A1 | 10/2012 |
| JP | 56-158126 A | 12/1981 |
| JP | 59-225232 A | 12/1984 |
| JP | 60194243 A | 10/1985 |
| JP | 02-092373 A | 3/1990 |
| JP | 09085043 A | 3/1997 |
| JP | 2001-170435 A | 6/2001 |
| JP | 2001232127 A | 8/2001 |
| JP | 3207936 B2 | 9/2001 |
| JP | 2005-090941 A | 4/2005 |
| JP | 2006275487 A | 10/2006 |
| JP | 2009-202137 A | 9/2009 |
| JP | 2010-149086 A | 7/2010 |
| WO | WO 8805693 A1 | 8/1988 |
| WO | WO 2002008160 A1 | 1/2002 |
| WO | WO 200212796 A2 | 2/2002 |
| WO | WO 2007128584 A1 | 11/2007 |
| WO | WO 2008155543 A2 | 12/2008 |
| WO | WO 2009126607 A2 | 10/2009 |
| WO | WO 2010091831 A1 | 8/2010 |
| WO | WO 2010124388 A1 | 11/2010 |
| WO | WO 2011114168 A1 | 9/2011 |
| WO | WO 2011146478 A1 | 11/2011 |
| WO | WO 2012134415 A1 | 10/2012 |
| WO | WO 2012158911 A2 | 11/2012 |
| WO | WO 2013/074973 A1 | 5/2013 |
| WO | WO 2013/106573 A1 | 7/2013 |

OTHER PUBLICATIONS

Jones, Christopher W., "CO2 Capture from Dilute Gases as a Component of Modern Global Carbon Management", Annual Review of Chemical and Biomolecular Engineering, vol. 2, pp. 31-52, 2011.

Ma, Chanjuan et al., "Removal of low-concentration formaldehyde in air by adsorption on activated carbon modified by hexamethylene diamine", Carbon, vol. 49, pp. 2869-2877, 2011.

Nuckols, M. L. et al., "Technical Manual: Design Guidelines For Carbon Dioxide Scrubbers", Naval Coastal Systems Center, vol. 4110, pp. 1-83, Revision A, Jul. 1985.

United States Environmental Protection Agency, "Carbon Adsorption for Control of VOC Emissions: Theory and Full Scale System Performance", vol. 450, pp. 88-012, Jun. 1988.

Serna-Guerrero, Rodrigo et al., "Triamine-grafted pore-expanded mesoporous silica for CO2 capture: Effect of moisture and adsorbent regeneration strategies", Adsorption, vol. 16, pp. 567-575, 2010.

International Search Report and Written Opinion, dated Sep. 5, 2012 for PCT/US2012/024333.

International Search Report and Written Opinion, dated Jul. 25, 2013 for PCT/US2013/035933.

International Search Report and Written Opinion, dated Dec. 20, 2013 for PCT/US2013/051077.

International Search Report and Written Opinion, dated Jan. 3, 2014 for PCT/US2013/042239.

International Search Report and Written Opinion, dated Mar. 22, 2013 for PCT/US2012/065600.

International Search Report and Written Opinion, dated Mar. 29, 2013 for PCT/US2013/021033.

International Search Report and Written Opinion, dated Mar. 17, 2014 for PCT/US2013/070383.

International Search Report and Written Opinion, dated Jul. 10, 2014 for PCT/US2014/023488.

International Search Report and Written Opinion, dated Aug. 15, 2014 for PCT/US2014/031009.

International Search Report and Written Opinion, dated Nov. 24, 2014 for PCT/US2014/055863.

International Search Report and Written Opinion, dated Nov. 24, 2014 for PCT/US2014/056097.

Sidheswaran, Meera A. et al., "Energy efficient indoor VOC air cleaning with activated carbon filter (ACF) filters", Building and Environment, vol. 47, Apr. 2011, pp. 357-367.

Zorflex® ACC, 100% Activated Woven Carbon Cloth, Calgon Carbon Corporation, 2008, www.calgoncarbon.com, 2 pages.

Zorflex® ACC, 100% Activated Woven Carbon Cloth, Calgon Carbon Corporation, 2011, www.calgoncarbon.com, 2 pages.

Gray, M. L. et al., "Performance of immobilized tertiary amine solid sorbents for the capture of carbon dioxide", International Journal of Greenhouse Gas Control, vol. 2, Issue 1, Jan. 2008, pp. 3-8.

International Search Report and Written Opinion, dated Sep. 27, 2011, for PCT/US2011/036801.

International Preliminary Report on Patentability, dated Nov. 29, 2012, for PCT/US2011/036801.

"EPA Ventilation and Air Quality in Offices, Fact Sheet" United States Environmental Protection Agency, Air and Radiation (6609J), Revised Jul. 1990.

International Preliminary Report on Patentability, dated Aug. 22, 2013, for PCT/US2012/024333.

International Preliminary Report on Patentability, dated May 30, 2014 for PCT/US2012/065600.

International Preliminary Report on Patentability, dated Jul. 24, 2014 for PCT/US2013/021033.

International Preliminary Report on Patentability, dated Oct. 23, 2014 for PCT/US2013/035933.

International Preliminary Report on Patentability, dated Dec. 4, 2014 for PCT/US2013/042239.

International Preliminary Report on Patentability, dated Jan. 29, 2015 for PCT/US2013/051077.

International Search Report and Written Opinion, dated Dec. 19, 2013 for PCT/US2013/061422.

International Preliminary Report on Patentability, dated Apr. 2, 2015 for PCT/US2013/061422.

International Preliminary Report on Patentability, dated May 28, 2015 for PCT/US2013/070383.

International Search Report and Written Opinion, dated Sep. 2, 2014, for PCT/US2014/035114.

International Search Report and Written Opinion, dated May 15, 2015, for PCT/US2015/015690.

Goeppert et al., "Carbon Dioxide Capture from the Air Using a Polyamine Based Regenerable Solid Adsorbent," J. Am. Chem. Soc., vol. 133, No. 50, Nov. 21, 2011 (Nov. 21, 2011) pp. 20164-20167 entire document.

International Search Report and Written Opinion, dated May 5, 2014, for PCT/US2014/011078.

International Search Report and Written Opinion, dated Jan. 28, 2013, for PCT/US2012/038343.

(56) References Cited

OTHER PUBLICATIONS

International Preliminary Report on Patentability, dated Nov. 28, 2013, for PCT/US2012/038343.
International Preliminary Report on Patentability, dated Jul. 23, 2015, for PCT/US2014/011078.

* cited by examiner

SYSTEMS AND METHODS FOR AIR-CONDITIONING SYSTEMS WITH SCRUBBING SYSTEMS INCLUDING A SCRUBBING BYPASS MODE

CROSS REFERENCE TO RELATED APPLICATIONS

This application is a continuation of and claims priority to and the benefit of U.S. patent application Ser. No. 13/738,737, filed Jan. 10, 2013, entitled "Methods And Systems For Managing Air Quality And Energy Use In Air-Conditioning Systems." which in turn claims priority to: U.S. Provisional Patent Application No. 61/585,201, filed Jan. 10, 2012 and entitled "Methods and Systems for Control of Air-Conditioning Systems"; and U.S. Provisional Patent Application No. 61/650,204, filed May 22, 2012 and entitled "Air Management Systems with Integrated Ventilation and Scrubbing Functionality". The disclosures of the above applications are incorporated herein by reference in their entireties.

TECHNICAL FIELD

The present application generally relates to systems providing air to an enclosed environment and more particularly to Heating, Ventilation and Air-Conditioning systems and control thereof.

BACKGROUND

Indoor air within and around enclosed environments, such as buildings, vehicles and structures, is affected by a plurality of contaminants. Among these contaminants, often with the highest concentration, is carbon dioxide ($CO_2$). There are other contaminants which may appear in relatively lower concentrations yet are no less important to monitor and/or reduce. A class of such contaminants is a group of species of organic vapors, broadly referred to as Volatile Organic Compounds (VOC). Contaminant gases (e.g., $CO_2$) and VOCs, and corresponding vapors thereof, may collectively be referred to as a "gas(es)". The sources of these contaminants include, inter alia, the human occupants themselves—from respiration and perspiration, to clothing and cosmetics—as well as building materials, equipment, food and consumer products, cleaning materials, office supplies or any other materials which emit VOCs. Other classes of contaminants are inorganic compounds and microorganisms such as bacteria, viruses, mold, fungi and airborne particles. Additional gaseous contaminants may be sulfur oxides, nitrous oxides, radon, or carbon monoxide.

Heating, Ventilation and Air-Conditioning ("HVAC") is used in virtually every modern building. One of the goals of HVAC systems is to provide a comfortable and healthy environment for the enclosed environment occupants, in terms of temperature, humidity, composition and quality of air.

In order to maintain good air quality, not all the air is returned. Some of the air is exhausted out of the enclosed environment and is replaced by an intake of fresh air from the outside. This is sometimes referred to as "fresh air", "makeup air" or ventilation. Such replacement of the air dilutes the contaminants within the indoor air and helps maintain good air quality in the enclosed environment.

However, there are a number of drawbacks to fresh air ventilation, including the energy required to condition the outdoor air (i.e., heat, cool, de-humidify), as well as the potential introduction of pollutants and contaminants from the outside into the enclosed environment. One possible solution to these drawbacks is to selectively remove the contaminants from indoor air, and certain schemes have been proposed for this purpose in conjunction with HVAC systems. For example, a system for removing the contaminants from indoor air in a HVAC system is disclosed in applicant's U.S. Pat. No. 8,157,892, which is incorporated herein by reference in its entirety.

Selective contaminant removal from the HVAC system is performed by directing the return air to a contaminant remover system and thereafter introducing the now treated return air back into the enclosed environment.

SUMMARY

As described hereinabove, good air quality can be maintained with lower energy expenditure by scrubbing some of the indoor air as it circulates in the enclosed environment. However, the tradeoff between scrubbing indoor air and introducing outdoor air can be fairly complex. Even when scrubbing capability is added to the enclosed environment's air circulation, it may not always be desirable or advantageous to operate it. Rather, at times, it may be desirable or energetically advantageous to introduce certain amounts of outdoor air into the enclosed environment. Accordingly, some embodiments of the present disclosure consider one or more parameters for managing such a tradeoff, which may include, inter alia:

occupancy of the enclosed environment,
a time of day or date,
a level of the contaminants in the indoor air,
a level of the contaminants in adsorbent material (used to scrub the air for at least one of gaseous contaminants and VOCs),
indoor air enthalpy,
temperature and/or indoor air humidity level, and
outdoor air enthalpy, temperature and/or an outdoor air humidity level.

Thus, in accordance with some embodiments of the present disclosure, a system and method of operating an HVAC system for an enclosed environment is provided. In such embodiments, the HVAC system may be configured to at least one of heat and cool air, and includes an air circulation system configured to circulate air (e.g., indoor air—air within the enclosed environment) at least within the enclosed environment. Such embodiments may also include a scrubbing system including an adsorbent material to reduce presence of at least one gas contaminant in the indoor air, as well as a controller system for controlling the operation of the air circulation system and the scrubbing system. The controller system may be configured to include two or more of at least the following operative modes: a scrubbing mode to scrub at least one gas contaminant from the indoor air, a scrubber regeneration mode to regenerate the adsorbent material, an economizer mode including introducing at least a portion of outdoor air into the enclosed environment (the outdoor air being from outside the enclosed environment), a scrubbing bypass mode where circulated air (e.g., indoor air) bypasses the scrubbing system and/or the scrubbing system is turned off, and a standby mode, where neither indoor air nor outdoor air is circulated. In such embodiments, a method for controlling may include determination of at least one of the following parameters: an occupancy level of the enclosed environment, a level of the at least one contaminant in the indoor air, a level of the at least one contaminant in the adsorbent material, a level of the at least one contaminant in air exiting the adsorbent material, an indoor air temperature and/or an indoor air humidity level, an outdoor air temperature and/or an outdoor air humidity level, and a time and/or date the HVAC system is operating. In some embodiments, the method may further include controlling activation of at least one of the air circulation system and the scrubbing system according to the operative modes based upon the at least one parameter.

According to some embodiments, the operative mode may be operated by controlling at least one of the following components of the HVAC system—one or more: fans, dampers, shutters, valves and heaters, configured to, for example, affect flow of air or other fluids in the HVAC system. For example, upon the occupancy level being at or below a predetermined number of people, and/or the time and date being outside of normal operating hours, the HVAC system may operate according to the standby mode or according to the scrubbing bypass mode.

According to some embodiments, the scrubber regeneration mode may be activated upon the occurrence of at least one of the following: a predetermined time of day, following a predetermined duration of the scrubbing system operation in the scrubbing mode, the level of at least one gas contaminant in the adsorbent material being at or above a predetermined threshold, and the level of at least one contaminant in air exiting the adsorbent material being at or above a predetermined threshold.

According to some embodiments, the scrubber regeneration mode may be operated for a period of time according to at least one of the following a predetermined period of time from the start of activation of the regeneration operative mode, the level of at least one gas contaminant in the adsorbent material, the level of at least one contaminant in air exiting the adsorbent material, and the level of at least one contaminant in the indoor air, a predetermined period of time after the level of at least one gas contaminant in the adsorbent material being at or below a predetermined threshold, a predetermined period of time after the level of at least one contaminant in air exiting the adsorbent material being at or below a predetermined threshold, and a predetermined period of time after the level of at least one contaminant in the indoor air being above a predetermined threshold.

The predetermined period of time may be determined according to any one of: the time and/or date the HVAC system is operating, and the outdoor air temperature and/or the outdoor air humidity level. The scrubber regeneration mode may include flowing a purging airflow over the adsorbent material so as to eliminate at least a portion of at least one gas contaminant held by the adsorbent material. The purging airflow may include outdoor air having a temperature and/or flow rate equal to or greater than a corresponding threshold value.

According to some embodiments, the scrubber regeneration mode may include operation at a plurality of different phases, wherein a single phase may be selected to operate at any one of: a temperature of the purge air, a duration of the purging airflow over the adsorbent material, and flow rate of the purging airflow over the adsorbent material. The economizer mode may include introducing into the enclosed environment at least a portion of outdoor air to reduce the amount of recirculated indoor air required to be conditioned or treated. The economizer mode may be selected based upon a comparison between the outdoor air temperature and/or humidity level relative to the temperature and/or humidity level of indoor air or return air, wherein the return air is the indoor air exiting the enclosed environment.

According to some embodiments, the scrubbing bypass mode may be activated upon the level of at least one gas contaminant present in the indoor air being at or below a predetermined level. The scrubbing mode may be activated upon the level of at least one gas contaminant present in the indoor air is at or greater than a predetermined level. The parameters may further include at least one of the following: a HVAC operation schedule, temperature, humidity, pressure, flow rate, and energy expenditure of a HVAC refrigerant, chiller, compressor and heat pump.

According to some embodiments, the level of at least one gas contaminant in the adsorbent material may be determined by comparing the level of at least one gas contaminant in air existing the scrubbing system to the level of at least one gas contaminant in air entering the scrubbing system.

According to some embodiments, the regeneration mode may be operative to eliminate at least about 35% of at least one gas contaminant that has been adsorbed in the adsorbent material. Upon the level of at least one gas contaminant of air exiting the scrubbing system being greater than the level of at least one gas contaminant of air entering the scrubbing system, the scrubbing bypass mode may be activated. Upon the scrubbing system malfunctioning, a predetermined amount of outdoor air may be introduced into the enclosed environment. Upon the scrubbing system malfunctioning, the system may provide an alert.

According to some embodiments, at least one gas contaminant is selected from the group consisting of carbon dioxide, volatile organic compounds, sulfur oxides, radon, nitrous oxides and carbon monoxide. The outdoor air may be introduced into the enclosed environment via an inlet, the inlet may be a pre-existing inlet in the enclosed environment or the inlet may be installed within the HVAC system for introducing the outdoor air.

According to some embodiments, the method may further include sensors for receiving data from the HVAC system, the enclosed environment or the outdoor environment, actuators or switches for controlling the scrubbing system, air circulation system or other components of the HVAC system, and an electronic data communications system that transmits data pertaining to the sensor readings or actuators to a data storage system. The data may be at least partially delivered or stored at a remote location via a data network. The data may be at least partially transmitted over a wireless data network. Stored data may be accessed, retrieved or analyzed at different locations via the internet.

In accordance with some embodiments, a system for operating an HVAC system for an enclosed environment is provided, where the HVAC system may be configured to at least one of heat and/or cool air, and the system may include an air circulation system configured to circulate air at least within the enclosed environment, the air within the enclosed environment comprising at least indoor air. In some embodiments, a scrubbing system may additionally be provided which includes an adsorbent material to reduce presence of at least one gas contaminant in the indoor air. In some embodiments, an outdoor air inlet may additionally be provided. The outdoor air may be for introducing at least a portion of outdoor air from outside the enclosed environment into the enclosed environment. The system may also include a controller system, which may control the operation of the outdoor air inlet, air circulation system and/or the scrubbing system. Such a controller system may be configured to include two or more of at least the following operative modes: a scrubbing mode to scrub the at least one gas contaminant from the indoor air, a scrubber regeneration mode to regenerate the adsorbent material, an economizer mode including introducing at least a portion of outdoor air into the enclosed environment, the outdoor air being from outside the enclosed environment, a scrubbing bypass mode wherein circulated air bypasses the scrubbing system and/or the scrubbing system is turned off, and a standby mode. In some embodiments, in the standby mode, neither indoor air nor outdoor air is circulated. The system may further include at least one sensor and/or at least one input for receiving information for determining at least one of the following parameters: an occupancy level of the enclosed environment, a level of at least one contaminant in the indoor air, a level of at least one contaminant in the adsorbent material, a level of at least one contaminant in air exiting the adsorbent material, an indoor air temperature and/or an indoor air humidity level, an outdoor air temperature and/or an outdoor air humidity level, and a time and/or date the HVAC system is operating. In some embodiments, the controller system controls at least one of the air circulation system and the scrubbing system according the operative modes based upon the at least one parameter determined by the at least one sensor and/or at least one input.

According to some embodiments, the system may further include a return air inlet, and one or more dampers, fans and/or blowers that control the amount and ratio of outdoor air, scrubbed air and return air that is recirculated. The return air may comprise the indoor air exiting the enclosed environment. The controller system may also control one or more of the dampers, fans and/or blowers and may also utilize sensor readings and/or other information to manage air circulation and supply. The at least one gas contaminant may be selected from the group consisting of carbon dioxide, volatile organic compounds, sulfur oxides, radon, nitrous oxides and carbon monoxide.

According to some embodiments, the system may further include one or more actuators and/or switches for controlling at least one of the scrubbing system, air circulation system or other components of the HVAC system, and may also include an electronic data communications system that can transmit data pertaining to the sensor readings and/or actuators to a data storage system. The data may be at least partially delivered and/or stored at a remote location via a data network. The data may be at least partially transmitted over a wireless data network. Stored data may be accessed, retrieved or analyzed at different locations via the internet.

In accordance with some embodiments, a digital controller system for controlling an HVAC system for an enclosed environment is provided. In such embodiments, the HVAC system may be configured to at least one of heating and cooling of air, and the HVAC system may include an air circulation system configured to circulate air at least within the enclosed environment, with the air within the enclosed environment comprising at least indoor air. The system may also include a scrubbing system including an adsorbent material to reduce presence of at least one gas contaminant in the indoor air. The digital controller system may be configured to include two or more of at least the following operative modes: a scrubbing mode to scrub at least one gas contaminant from the indoor air, a scrubber regeneration mode to regenerate the adsorbent material, an economizer mode including introducing at least a portion of outdoor air into the enclosed environment (where the outdoor air is from outside the enclosed environment), a scrubbing bypass mode where circulated air bypasses the scrubbing system and/or the scrubbing system is turned off, and a standby mode, where neither indoor air nor outdoor air is circulated. The digital controller system may be configured to receive information corresponding to at least one of the following parameters: an occupancy level of the enclosed environment, a level of at least one contaminant in the indoor air, a level of at least one contaminant in the adsorbent material, a level of at least one contaminant in air exiting the adsorbent material, an indoor air temperature and/or an indoor air humidity level, an outdoor air temperature and/or an outdoor air humidity level, and a time and/or date the HVAC system is operating. The controller system may control activation of at least one of the air circulation system and the scrubbing system according to at least the operative modes based upon one or more of the parameters.

In accordance with some embodiments, a system for recording and transmitting data on the operation of an HVAC system for an enclosed environment is provided, where the HVAC system may be configured to at least one of heating and cooling of air. The HVAC system may comprise: an air circulation system configured to circulate air at least within the enclosed environment (the air within the enclosed environment including at least indoor air), and a scrubbing system including an adsorbent material to reduce presence of at least one gas contaminant in the indoor air. The system may further include sensors for receiving data from the HVAC system, the enclosed environment and/or the outdoor environment, actuators and/or switches for controlling the scrubbing system and/or the air circulation system, and an electronic data communications system that transmits data pertaining to the sensor readings and/or actuators to a data storage system.

According to some embodiments, the data may be at least partially delivered and/or stored at a remote location via a data network. The data may be at least partially transmitted over a wireless data network. Stored data may be accessed, retrieved and/or analyzed at different locations via the internet.

BRIEF DESCRIPTION OF THE DRAWINGS

The principles and operations of the systems, apparatuses and methods according to some embodiments of the present disclosure may be better understood with reference to the drawings, and the following description. These drawings are given for illustrative purposes only and are not meant to be limiting.

DETAILED DESCRIPTION

Figure 1A:
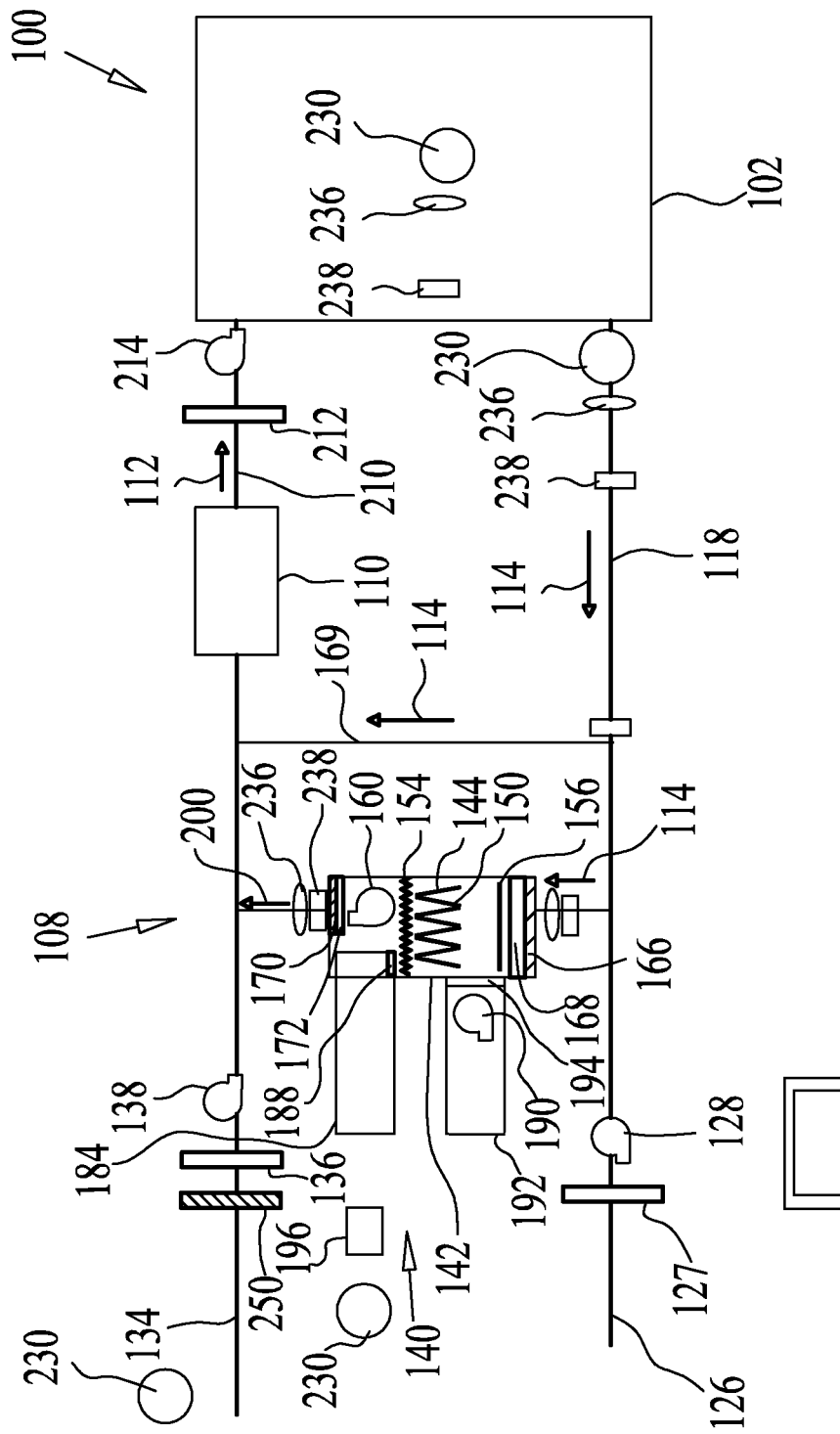
FIGS. 1A, 1B, 1C and 1D are each a simplified schematic illustration of an HVAC system for an enclosed environment at different operative modes, according to some embodiments of the present disclosure.

FIGS. 1A-1D are each a simplified schematic illustration of an HVAC system 100 for an enclosed environment 102 at different operative modes according to some embodiments of the present disclosure. As seen in FIGS. 1A-1D, the HVAC system 100 may comprise an air circulation system 108 configured to circulate air of the enclosed environment 102. The air circulation system 108 may comprise any suitable configuration for selectively conditioning air introduced in enclosed environment 102. In the embodiment of FIGS. 1A-1D, the air circulation system 108 may comprise an air handling unit 110 for conditioning supply air 112 prior to entering the enclosed environment 102. Conditioning may include, for example, cooling, dehumidification and/or heating.

The enclosed environment 102 may be an office building, a commercial building, a bank, a residential building, a house, a school, a factory, a hospital, a store, a mall, an indoor entertainment venue, a storage facility, a laboratory, a vehicle, an aircraft, a ship, a bus, a theatre, a partially and/or fully enclosed arena, an education facility, a library and/or other partially and/or fully enclosed structure and/or facility which can be at times occupied by equipment, materials, live occupants (e.g., humans, animals, synthetic organisms, etc.), etc., and/or any combination thereof and which has access to outdoor air.

Return air 114, that is, indoor air exiting the enclosed environment 102, typically comprises a relatively higher concentration of contaminants than desired for maintaining good air quality within the indoor air of the enclosed environment 102. An example of such contaminants may be, inter alia, carbon dioxide, sulfur oxides, nitrous oxides, radon, or carbon monoxide, VOCs and microorganisms including, inter alia, bacteria, viruses and fungi. The return air 114 may exit the enclosed environment 102 via fluid conduits 118.

In accordance with some embodiments, the return air 114 may be partially exhausted into the outside atmosphere, or any other environment, and may be partially reintroduced into the enclosed environment 102. The exhausted air 124 (FIG. 1C), may egress the HVAC system 100 in any suitable manner, such as via exhaust ducts 126. The volume of the exhausted exhaust air 124 may be controlled by an exhaust air damper 127 and an exhaust air fan 128 or any other suitable means.

Figure 1B:
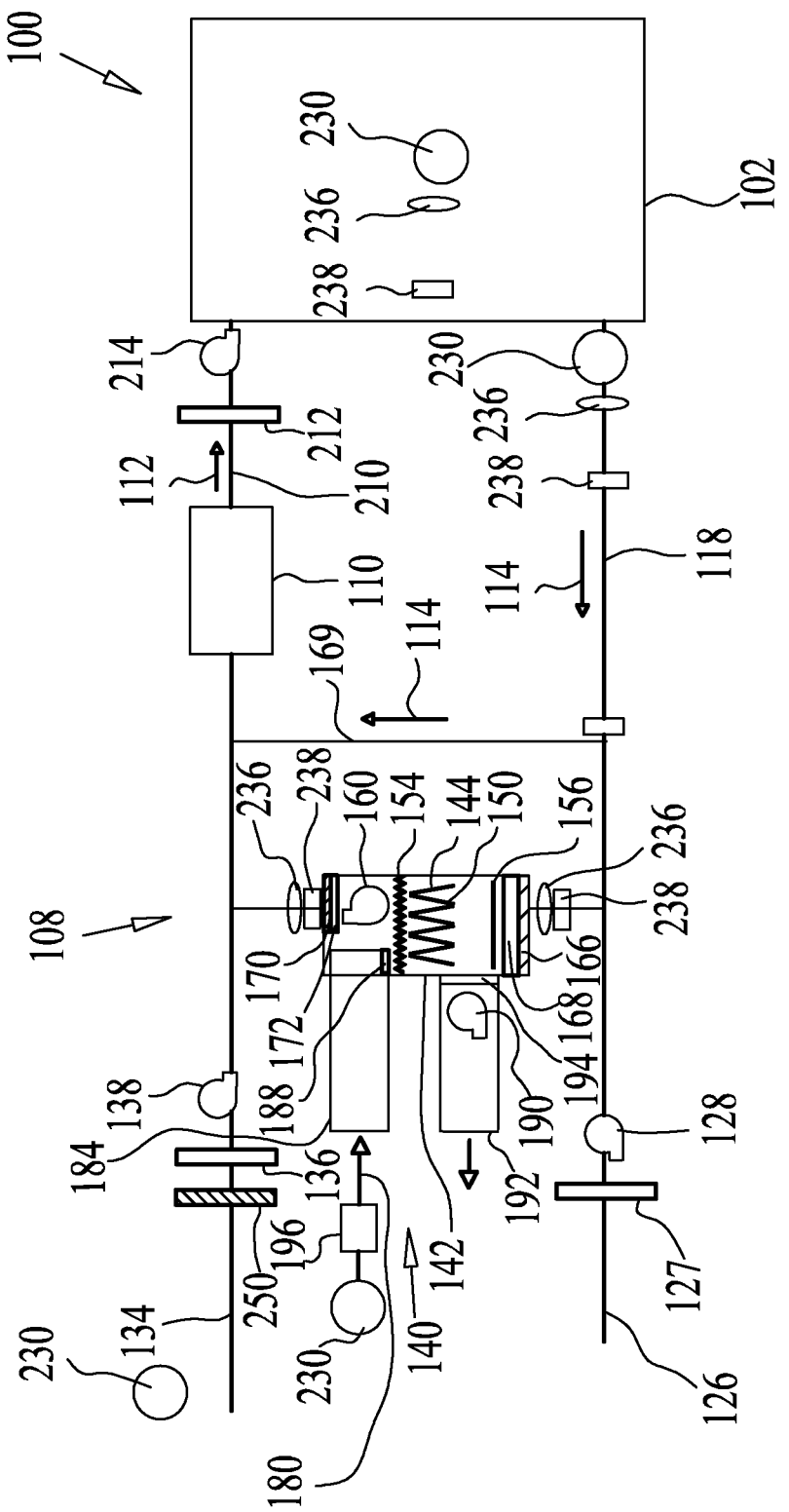
Figure 1C:
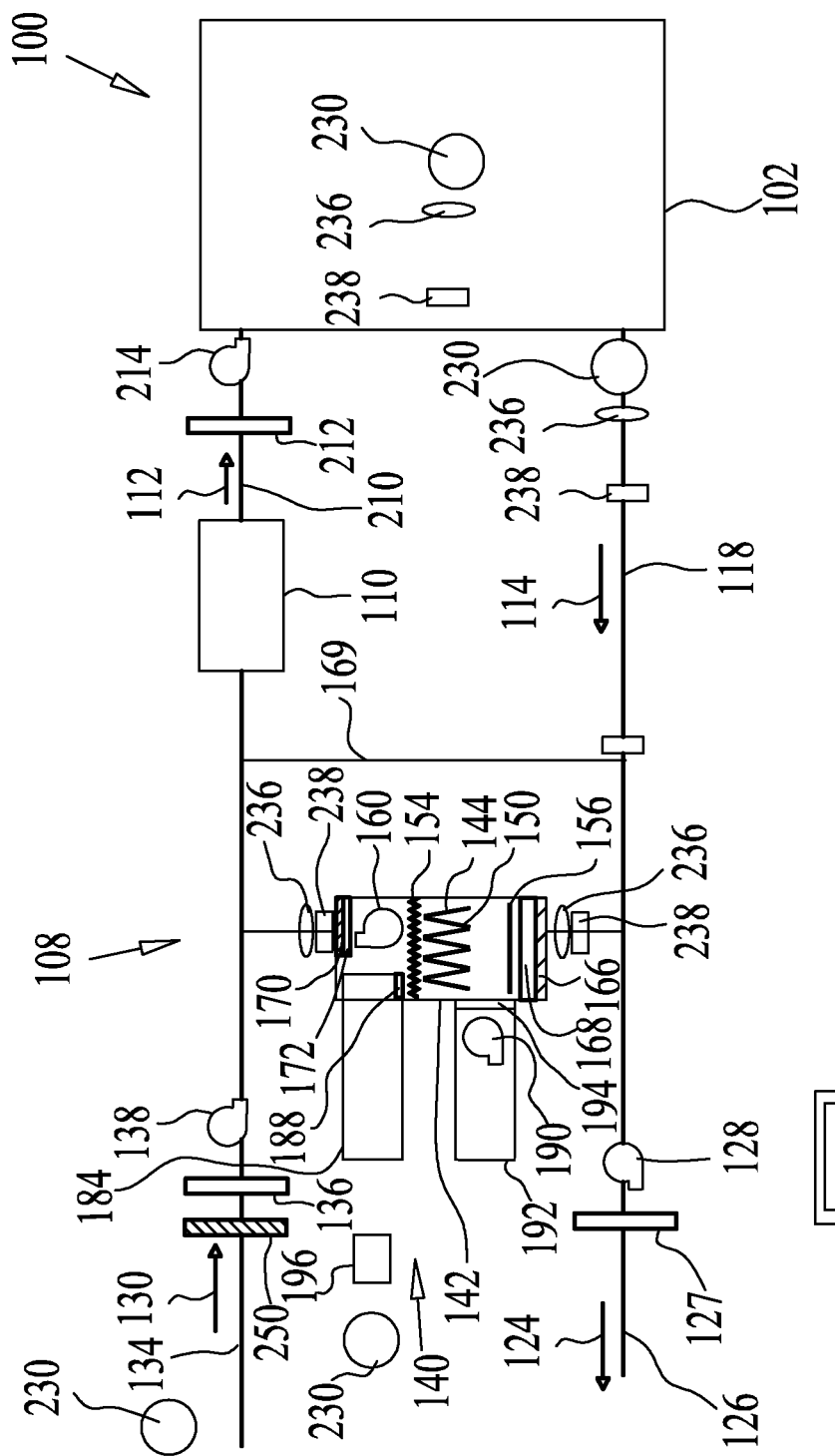

A portion of fresh, outdoor air 130, or namely "makeup air", shown in FIG. 1C, may be introduced into the air circulation system 108 via intake ducts 134 for temperature adjustment thereof prior to introduction into the enclosed environment 102. The volume of the portion of outdoor air 130 flowing into the HVAC system 100 may be controlled by an outdoor air damper 136 and an outdoor air fan 138, or by any other suitable means. The outdoor air damper 136 and outdoor air fan 138 may be placed at any suitable location, such as along intake ducts 134.

In order to reduce the required amount of outdoor air 130 without allowing an increase in contaminant levels, a scrubbing system 140 may be configured to intercept a portion of the return air 114 and remove at least some of the contaminants therefrom.

The scrubbing system 140 may comprise an adsorbent material to reduce the presence of at least some of the contaminants in the return air 114. The scrubbing system 140 may comprise a single or plurality scrubbing assemblies 142 containing the adsorbent material. The scrubbing assembly 142 may include a $CO_2$ scrubber 144. Examples of $CO_2$ scrubbers are disclosed in applicant's U.S. Pat. No. 8,157,892, which is incorporated herein by reference in its entirety. The $CO_2$ scrubber 144 may comprise any suitable material for capturing $CO_2$, such as a $CO_2$ adsorbent material. An exemplary $CO_2$ adsorbent material may be a solid support material supporting an amine-based compound, such as disclosed in applicant's PCT application PCT/US12/38343, which is incorporated herein by reference in its entirety. Other adsorbent materials include, but are not limited to, granular adsorbent particles, clay-based adsorbents, carbon, activated carbon, zeolites, natural zeolite, activated charcoal, molecular sieves, silica, silica gel, porous silica, alumina, porous alumina, titanium oxide, carbon fibers, porous polymers, polymer fibers and metal organic frameworks.

The $CO_2$ scrubber 144 may include a plurality of $CO_2$ scrubbing cartridges 150. The $CO_2$ scrubbing cartridges 150 may comprise the adsorbent material formed as a solid or flexible sheet or as granules supported by porous surfaces. The scrubbing cartridges 150 may be arranged in any suitable arrangement. For example, the $CO_2$ scrubbing cartridges 150 may be arranged in parallel therebetween. Alternatively, as seen in FIGS. 1A-1D, the $CO_2$ scrubbing cartridges 150 may be staggeringly arranged therebetween. This staggered arrangement allows substantially parallel air flow paths of the return air 114 therethrough. Exemplary $CO_2$ scrubbing cartridges and modules are disclosed in applicant's US Patent Publication No. 20110198055, which is incorporated herein by reference in its entirety.

An additional contaminant may be VOCs. As such, the scrubbing assembly 142 may include or comprise a VOC scrubber 154 for removing VOCs from the return air 114 flowing therethrough. The VOC scrubber 154 may comprise any suitable adsorbent material for adsorbing the VOCs. For example, VOC adsorbent materials may comprise a hydrophobic zeolite, natural zeolite, synthetic zeolite, carbon cloth, carbon, activated carbon, a molecular sieve, polymers, a thin permeable sheet structure, carbon fibers, or granular adsorbent particles attached to a sheet of some other permeable material, such as paper, cloth or fine mesh, for example.

The VOC scrubber 154 may be arranged in any suitable arrangement, such as a bed of granular material, a flat sheet, or a pleated sheet, as shown in FIGS. 1A-1D.

A filter 156 may be provided for removing additional contaminants, such as dirt, small airborne particles and may comprise any suitable filter or adsorbent material.

As shown in FIG. 1A, a portion of the return air 114 may be urged by a scrubber fan 160 to flow into the scrubbing assembly 142. The return air 114 may flow into the scrubbing assembly 142 via an entry port 166 including an entry damper 168.

The volume of the portion of return air 114 flowing into the scrubbing assembly 142 may be controlled by the scrubber fan 160 and/or entry damper 168, or by any other suitable means. The remaining return air 114, which bypassed the scrubbing system 140, may flow directly to the air handling unit 110, via ducts 169, or to any other suitable location within the HVAC system 100.

The scrubber fan 160 may be placed in any suitable location within the scrubbing system 140, such as upstream in a "push" mode, i.e. intermediate the entry port 166 and the $CO_2$ scrubber 144. Alternatively, as seen in FIGS. 1A-1D, the scrubber fan 160 may be placed downstream in a "pull" mode i.e. after the $CO_2$ scrubber 144.

The return air 114 may flow through the filter 156, $CO_2$ scrubber 144 and/or the VOC scrubber 154. The now scrubbed air flows out of the scrubbing system 140 via an exit port 170 including an exit damper 172.

Following the capture and scrubbing of the contaminants in the scrubbing assembly 142, in some embodiments, the adsorbent material may be regenerated by urging the release of the contaminants from the adsorbent material.

The regeneration may be performed in any suitable manner. As shown in FIG. 1B, for example, in some embodiments, regeneration may be performed by streaming a purge gas 180 over and/or through the adsorbent material for release of at least a portion of the contaminants therefrom.

For example, during regeneration, the purge gas 180 flows into the scrubbing assembly 142 via an entry conduit 184 including a purge gas entry damper 188, when positioned in an open state. A purge gas fan 190 may be provided for urging flow of the purge gas 180 within the scrubbing assembly 142. The purge gas fan 190 may be placed in any suitable location, such as in an exhaust conduit 192. Alternatively, the purge gas fan 190 may be omitted.

In accordance with some embodiments, the regeneration may be performed by flowing a purging airflow of the purge gas 180 over the adsorbent material.

In accordance with some embodiments, the purge gas 180 comprises outdoor air.

The outdoor air may be introduced into the scrubbing assembly 142 from any source of outdoor air. For example, the source of outdoor air may be ambient air flowing directly from the ambient, that is—out of the enclosed environment 102, into the scrubbing assembly 142. Alternatively, the outdoor air may flow from the ambient into the scrubbing assembly 142 via intake ducts 134.

As shown in FIG. 1B, in some embodiments, the purge gas 180 may flow during regeneration in the opposite direction of the return air flow, such as from entry conduit 184 to the exhaust conduit 192. Alternatively, the purge gas 180 may flow during regeneration in the same direction of the return air flow, such as from exhaust conduit 192 to entry conduit 184.

The exhaust conduit 192 may include a purge gas exit damper 194.

It is noted that the entry conduit 184 may be replaced by an aperture allowing the purge gas 180 to flow into the scrubbing assembly 142. The exhaust conduit 192 may be replaced by any exhaust allowing the purge gas 180 to flow out of the scrubbing assembly 142.

As seen in FIG. 1B, in some embodiments, the purge gas 180 exiting the exhaust conduit 192 is discharged into the ambient, out of the enclosed environment 102.

The purge gas 180 may be heated prior to regeneration of the scrubbing assembly 142 by any suitable heater 196 (and/or heat exchanger). The heater 196 may comprise, for example, a coil or radiator heated by a warm fluid. In some embodiments, the warm fluid may be heated within a heating plant or boiler (not shown) provided specifically for heating the purge gas 180. In some embodiments, the warm fluid may be heated by an existing supply of warm fluid provided in a standard enclosed environment 102, such as a building's hot water supply. In some embodiments, the heater 196 may comprise, for example, an electric heating coil or solar heat, such as solar heat provided to the enclosed environment 102 or an appropriately sized furnace burning gas or other fuel (not shown) for heating the purge gas 180.

In some embodiments, the heater 196 may comprise a heat pump. Use of a heat pump may be advantageous, since to operate the heat pump less power is required than other heating means, such as electric heating, for example. In some embodiments, an evaporator side or a cold side of the heat pump may be used to remove heat from the return air 114 flowing into the enclosed environment 102.

As shown in FIG. 1B, the purge gas 180 may be heated prior to flowing into the scrubbing assembly 142. Additionally, the purge gas 180 may be heated within the scrubbing assembly 142, such as in entry conduit 184. Additionally, the regeneration may be performed by direct heating of the adsorbent material by the heater 196 and thus the purge gas 180 may be obviated. Additionally, the regeneration may be performed by changing the concentration of a contaminant, such as $CO_2$, of the purge gas 180 or may be performed by changing the partial pressure of a contaminant, such as $CO_2$, of the purge gas 180.

In accordance with some embodiments, the purge gas 180 may have a temperature and/or flow rate equal to or greater than a corresponding threshold value. This threshold value may be determined as the threshold value allowing sufficient regeneration of the adsorbent material.

In accordance with some embodiments, the purge gas 180 may be heated within a range of approximately 20-120° C. In accordance with some embodiments, the purge gas 180 may be heated to a temperature of less than 80° C. In accordance with some embodiments, the purge gas 180 may be heated to a temperature of less than 60° C. In accordance with some embodiments, the purge gas 180 may enter the scrubbing assembly 142 at the ambient temperature.

Regeneration of the adsorbent material removes the contaminants from the adsorbent material. Therefore, the scrubbing assembly 142 can be repeatedly used for removing contaminants from the enclosed environment 102 without requiring replacement of the adsorbent material. Accordingly, the scrubbing assembly 142 according to some embodiments, has a significantly long operating life.

As seen in FIG. 1A, scrubbed air 200 exiting the scrubbing system 140, now with a reduced concentration of contaminants, may combine with the additional return air 114 that has not been exhausted and is shown to flow via ducts 169. The partially or fully scrubbed air 200 may enter the air handling unit 110 for conditioning thereof, prior to being supplied to the enclosed environment 102 as supply air 112. In addition to the scrubbed air 200, the supply air 112 may also comprise a portion of the fresh outdoor air 130 (FIG. 1C). The supply air 112 my flow in supply air ducts 210 to the enclosed environment 102. The volume of the supply air 112 may be controlled by a supply air damper 212 and a supply air fan 214 or any other suitable means.

The scrubbing system 140 may be placed at any suitable location within the HVAC system 100.

The scrubbing system 140 may receive air from any suitable location within the HVAC system 100. In the embodiment shown in FIGS. 1A-1D, the scrubber system 140 receives return air 114 from the return air ducts 118. In some embodiments, the scrubbing system 140 may receive air directly from the air handling unit 110 and/or may receive supply air 112 from the supply air ducts 210. In some embodiments, the scrubbing system 140 may receive air directly from the enclosed environment 102, or from a plenum thereof, as will be further described in reference to FIG. 2A.

In accordance with some embodiments, a controller system 220 is provided for controlling the operation of an inlet for outdoor air 130 (e.g. outdoor air inlet 250 further described) and the scrubbing system 140 for selecting a preferred mode for maintaining good air quality within the enclosed environment 102 with the lowest energy expenditure of the HVAC system 100.

In accordance with some embodiments, the controller system 220 may further control the operation of the air circulation system 108 in addition to the scrubbing system 140 and the outdoor air inlet. In some embodiments, the outdoor air inlet may be part of the air circulation system 108 and in some embodiments the outdoor air inlet may be installed and controlled separately from the air circulation system 108.

The controller system 220 may receive data (via, for example, one or more sensors) from the air circulation system 108 and the scrubbing system 140 and accordingly select a preferred mode. The data may comprise a plurality of parameters such as, inter alia, an occupancy level of the enclosed environment 102, a time of day or date, level of a contaminant in the indoor air within the enclosed environment 102, a level of a contaminant in the adsorbent material within the scrubbing assembly 142, an indoor air enthalpy, temperature and/or an indoor air humidity level and an outdoor air enthalpy, temperature and/or an outdoor air humidity level.

These parameters may be determined in any suitable method. For example, a temperature and/or humidity sensor 230 may be placed within the enclosed environment 102 for measuring the temperature and/or humidity within the indoor air of the enclosed environment 102 and may be placed out of the enclosed environment 102 for measuring the temperature and/or humidity within the outdoor air in the ambient. Additionally, a temperature and/or humidity sensor 230 may be provided to measure the temperature and/or humidity of heater 196. Other sensors for measuring the pressure, volume and/or energy may be provided for determining the abovementioned parameters.

The occupancy of the enclosed environment 102 may be determined by any suitable method, such as $CO_2$ sensors, motion detectors, infrared detectors, cameras, entry and egress monitoring, or any other means.

Contaminant sensors, such as a $CO_2$ sensor 236, a VOC sensor 238 and/or any other contaminant sensors may be placed within the indoor air of the enclosed environment 102 to measure the contaminant level therein. In some embodiments, the contaminant level may be equivalent to the amount or concentration of the contaminants in the indoor air.

The contaminant sensors may be placed at any suitable location, such as within the enclosed environment 102 and/or at the exit of the return air 114 from the enclosed environment 102, for example.

The enclosed environment may comprise a plurality of indoor spaces, such as indoor spaces 320 of FIGS. 2A-2D. In each indoor space, a different contaminant level may be measured. Contaminant sensors may be placed in one or more of the plurality of indoor spaces. The controller system 220 may be operative to calculate a single value of the contaminant level representing the different contaminant levels within the plurality of indoor spaces, using any suitable algorithm known in the art. Similarly, in each indoor space a different occupancy, temperature or humidity level may be measured. Appropriate sensors may be placed in the plurality of indoor spaces. The controller system 220 may be operative to calculate a single value of the occupancy, temperature or humidity level representing the different occupancy, temperature or humidity levels within the plurality of indoor spaces, using any suitable algorithm known in the art.

The contaminant sensor(s) may be placed within the scrubbing system 140 for measuring the level of contaminants in the adsorbent material within the scrubbing assembly 142. The contaminant sensor(s) may be placed at any suitable location within the scrubbing system 140, such as in proximity to the entry port 166 of at least one scrubbing assembly 142 and/or to the exit port 170 therefrom. The level of contaminants in the adsorbent material may be determined by comparing the level of contaminants measured in the air at the exit port 170 to the level of contaminants measured in the air at the entry port 166.

The scrubbing system 140, in some embodiments, may comprise a plurality of scrubbing assemblies 142 the contaminant sensors may be placed at an entry port and exit port of scrubbing system 140 or at the entry port and exit port of a least some of the scrubbing assemblies 142.

The controller system 220 may receive any other additional data for controlling the operation of the air circulation system 108 and the scrubbing system 140. For example, the HVAC system settings, such as the time, such as the time of day, date and operation schedule may be provided. Additionally, signals from pressure gauges, air flow meters of the return air 114 circulating in the circulation system and/or of the outdoor air 130 may be received by the controller system 220. Moreover, data may be received from components within the HVAC system 100, such as the temperature, humidity, pressure or flow rate, and energy expenditure of an HVAC refrigerant, chiller, compressor, air handling unit 110 and/or heat pump, for example.

According to the data received by the controller system 220, the controller system 220 may send control signals to the air circulation system 108 and the scrubbing system 140 for activation of components thereof. These components may be, for example, one or more of the fans, such as scrubber fan 160, purge gas fan 190, supply air fan 214, exhaust air fan 128 and outdoor air fan 138; one or more of the dampers, such as respective entry damper and exit damper 168 and 172 of the scrubbing assembly 142, respective purge gas entry damper and exit damper 188 and 194, supply air damper 212, exhaust air damper 127 and outdoor air damper 136; and heater 196.

The controller system 220 may include control and logic functionality including mechanical and circuitry components, actuators, switches and programmed algorithms and any other elements for controlling the air circulation system 108 and the scrubbing system 140. The controller system 220 may activate the air circulation system 108 and the scrubbing system 140 to operate in accordance with a selected operative mode. Additionally, the controller system 220 may control the duration of each selected operative mode and amounts of return air 114, indoor air and/or outdoor air 130, introduced within the HVAC system 100. The controller system 220 may be programmed to receive data continuously, or at predetermined time intervals and accordingly activate the air circulation system 108 and the scrubbing system 140.

In accordance with some embodiments, the controller system 220 may collect and/or store the data, such as the data received by one or more of the sensors described above, data pertaining to the selected operative mode, the HVAC system settings and schedule (e.g. the times the HVAC system 100 is operated), data pertaining to energy consumption of the HVAC system 100 and any other data related to the HVAC system 100. Additionally, an electronic data communications system may transmit information pertaining to the sensor readings and/or actuators to a data storage system.

This data may be stored in the data storage system using any suitable storage functionality (not shown) in the vicinity of the controller system 220 or remotely therefrom via a data network. The data may be transmitted by transmission functionality in any suitable manner, such as over a wireless or wireline network, for example. Examples of a wireless or wireline network may be standard public wireline networks, public wireless networks, such as cellular phone networks, WiFi, Bluetooth, satellite, the internet, or any specialized or proprietary communications networks.

The collection of such data may be valuable for analyzing patterns, trends and influences related to energy consumption or air quality and to use this analysis to achieve better energy utilization practices, evaluate new technologies or products, and support commercial, social or scientific goals, for example.

The controller system 220 may comprise a digital controller or any other suitable form for controlling the HVAC system 100.

In FIGS. 1A-1D exemplary operative modes are shown.

In FIG. 1A a scrubbing mode is shown. During the scrubbing mode, a portion of the return air 114 flows into the scrubbing assembly 142 of the scrubbing system 140. The scrubbing mode may be operated in accordance with: (i) the indoor air quality being out of a desired air quality range, (ii) the conditions of the return air 114 being closer to the desired conditions of the supply air 112 than the conditions of the outdoor air, and/or (iii) where the energy cost for conditioning the outdoor air 130 is greater than the energy cost for conditioning the return air 114. These may occur where the level of a contaminant present in the indoor air is at or greater than a predetermined contaminant threshold, and the outdoor conditions are such that the level of the enthalpy and/or the humidity and/or the temperature level of the outdoor air 130 is significantly higher (or lower) than the return air 114.

Therefore, in some embodiments, energy expenditure is required for scrubbing a portion of the return air 114 without requiring the energy expenditure for conditioning makeup, outdoor air 130.

The contaminant level of the indoor air may be determined in any suitable manner, such as by the $CO_2$ sensors 236, VOC sensors 238, and/or any other contaminant sensors. The contaminant predetermined level may be defined as a contaminant threshold constituting good air quality (e.g., according to scientific or government bodies), and which may be known in the art or calculated in any suitable manner.

The enthalpy and/or the humidity and/or the temperature level the outdoor air 130 and indoor air may be determined in any suitable manner, such as by the temperature and/or humidity sensor 230, sensors measuring pressure, volume and/or energy, for example.

The energy cost for conditioning the outdoor air 130 and the return air 114 may be determined in any suitable manner, such as by receiving data pertaining to the energy expenditure of the HVAC system 100 for conditioning the outdoor air 130 and the return air 114 and the cost thereof. Additionally, data pertaining to the calculated energy expenditure of the HVAC system 100 may be considered by the controller system 220, such as the temperature, humidity, and air flow rate.

The volume of the portion of return air 114 (or in some embodiments, the air flowing from any suitable location in the HVAC system 100) flowing into the scrubbing assembly 142 may be controlled by the scrubber fan 160 and/or entry damper 168, or by any other suitable means. In a non-limiting example, a volume of approximately 1%-50% of the return air 114 may enter the scrubbing assembly 142. In a non-limiting example, a volume of approximately 1%-25% of the return air 114 may enter the scrubbing system 140. In a non-limiting example, a volume of approximately 1%-10% of the return air 114 may enter the scrubbing system 140. The remaining return air 114, which bypassed the scrubbing system 140, may flow directly to the air handling unit 110, via ducts 169, or to any other suitable location within the HVAC system 100.

During the scrubbing mode, the entry damper 168 and exit damper 172 may be open. The purge gas entry damper 188 and purge gas exit damper 194 may be closed.

In some embodiments, the outdoor air damper 136 is closed and the supply air 112 comprises the return air 114 with at least a portion of scrubbed air 200. In some embodiments, the outdoor air damper 136 may be opened to allow flow of a minimal volume of outdoor air 130 into the HVAC system 100 and may be referred to as the minimum level volume. The minimum level volume may be a volume required to maintain a certain air pressure in the enclosed environment 102 for making up for losses and exhausted air in the enclosed environment 102.

In some embodiments, the outdoor air damper 136 is open and a portion of outdoor air 130 above the minimum level volume is introduced into the HVAC system 100. The controller system 220 may be configured to select an energy efficient combination ratio of scrubbed air 200, unscrubbed return air 114 and/or outdoor air 130 (in some embodiments, the most efficient) to be introduced as supply air 112 into the enclosed environment 102, while maintaining good air quality therein.

In FIG. 1B a scrubber regeneration mode is shown. During the scrubber regeneration mode, purge gas 180 may flow into the scrubbing assembly 142 of the scrubbing system 140 or the regeneration may be performed in any suitable manner. The controller system 220 may activate the scrubber regeneration mode in accordance with various embodiments, which some are described as follows.

In some embodiments, the scrubber regeneration mode may be operated such that the adsorbent material of the scrubbing assembly 142 is saturated with the contaminant or is at or above a predetermined threshold. Saturation of the adsorbent material may be determined in any suitable manner, such as where the contaminant level measured in the air at the exit port 170 of the scrubbing assembly 142 is above the contaminant predetermined level. In some embodiments, saturation of the adsorbent material may be determined by monitoring a scrubbing efficiency. The scrubbing efficiency may be defined as one minus the ratio of the concentration of contaminants. The ratio of contaminants may be defined as the ratio of concentration of contaminants within the scrubbed air exiting the adsorbent material to the concentration of contaminants within the air entering the adsorbent material. In some embodiments, upon the scrubbing efficiency dropping below a desired level, scrubber regeneration may be required.

In some embodiments, the scrubber regeneration mode may be operated at predetermined time intervals or at predetermined times during the day or year. In some embodiments, the scrubber regeneration mode may be operated when the scrubbing mode is inactive, such as when the occupancy within the enclosed environment 102 is low.

In some embodiments the scrubber regeneration mode may be operated for a predetermined period of time, such as in a non-limiting example, for about 1 minute to about 30 minutes. In some embodiments the predetermined period of time may be determined according to the time and/or date the HVAC system is operating. For example, during nighttime wherein occupancy is low, the scrubber regeneration mode may be relatively shorter that during the day, since the contaminant level in the adsorbent material is lower. In some embodiments the predetermined period of time may be determined according to the outdoor air temperature and/or the outdoor air humidity level. For example, upon the purge gas being outdoor air, during the summer the scrubber regeneration mode may be operated for a shorter period of time than during the winter. This may be since less time is required to heat the outdoor air during the summer.

In some embodiments, the scrubber regeneration mode may be operated until the level of the contaminants in the adsorbent material is at or below a predetermined threshold, i.e. the adsorbent material is sufficiently regenerated. Similarly, in some embodiments, the scrubber regeneration mode may be operated until the level of the contaminants in air exiting the adsorbent material is at or below a predetermined threshold.

In some embodiments, the scrubber regeneration mode may be operated until the level of the contaminant in the adsorbent material being at or below a predetermined threshold and may continue to operate thereafter for an additional predetermined period of time. In some embodiments, the scrubber regeneration mode may be operated until the level of the contaminant in air exiting the adsorbent material is at or below a predetermined threshold and may continue to operate thereafter for an additional predetermined period of time. In some embodiments, the scrubber regeneration mode may be operated until the level of the contaminant in the indoor air being above a predetermined threshold and may continue to operate thereafter for an additional predetermined period of time.

In some embodiments, the scrubber regeneration mode may be operated for a period of time determined by the controller system 220 to regenerate a portion of the adsorbent material. In a non-limiting example, approximately 35% of the contaminants in the adsorbent material may be removed. In some embodiments, the scrubber regeneration mode may be operated for a period of time determined by the controller system 220 to regenerate a majority the adsorbent material, such as over 50% (for example).

In some embodiments, the scrubber regeneration mode may be operated for a period of time upon the outdoor temperature being between about 30 degrees C. and about 50 degrees C.

In some embodiments, the scrubber regeneration mode may be operated for a relatively long duration, such as when the occupancy within the enclosed environment is low, such as being at or below a predetermined number of people, so as to remove a relatively large portion of contaminants from the adsorbent material. Alternatively, the scrubber regeneration mode may be operated for a relatively short duration, such as when the occupancy within the enclosed environment is high. Therefore the adsorbent material may be minimally regenerated to allow activation of the scrubbing mode.

In some embodiments, the scrubber regeneration mode may include a plurality of different phases, including, for example, a single phase which may be selected to operate at a temperature of the purge gas, a duration of the purging airflow over the adsorbent material, and/or an air flow rate of the purging airflow over the adsorbent material. In a non-limiting example, the scrubber regeneration mode may operate according the following sequence of phases: initially at a warm-up phase, outdoor air may flow over the adsorbent material at a face velocity of 5 centimeters/second for 10 minutes, while warming the outdoor air from the ambient temperature to 50° C. At an intermediate phase, the outdoor air may flow at a face velocity of 10 centimeters/second for 10 minutes remaining at 50° C., while regenerating the adsorbent material. At the last cool-down phase, the outdoor air may be unheated, namely entering at the ambient temperature, at the face velocity of 15 centimeters/second for 10 minutes. The controller system may determine the phases according to any one of the abovementioned parameters. Additionally, the controller system may operate according to preset phase sequences.

In some embodiments, the scrubber regeneration mode may be operated for a period of time until the level of the at least one contaminant in the indoor air being above a predetermined value, namely, where the contaminant level in the indoor air is high and operation of the scrubbing mode is immediately required.

In some embodiments, the controller system 220 may elect not to activate the scrubber regeneration mode, even upon the adsorbent material being saturated, so as to avoid unnecessary regeneration. This may occur, for example, when the HVAC system 100 is approaching a circulation off or standby mode, or the circulation system 108 is inactive.

The controller system 220 may activate the heater 196 for heating the purge gas 180 prior to regeneration of the adsorbent material and may thus control the temperature of the purge gas 180 along with the purge gas air flow rate and duration or any other parameter required for selecting the most efficient operation of the scrubber regeneration mode.

In some embodiments, during the scrubber regeneration mode, the entry damper 168 and exit damper 172 may be closed. As such, the purge gas entry damper 188 and purge gas exit damper 194 may be opened. In some embodiments, the outdoor air damper 136 may be closed as shown in FIG. 1B, or opened to allow the minimal level volume of outdoor air 130 into the enclosed environment 102. In some embodiments, the outdoor air damper 136 may be opened to allow an above minimal level volume of outdoor air 130 into the HVAC system 100, such as wherein the outdoor air temperature is not significantly lower than the desired supply air temperature.

In some embodiments, the scrubbing system 140 may comprise a plurality of scrubbing assemblies. Accordingly, the controller system 220 may activate the scrubbing mode of a first scrubbing assembly while the scrubber regeneration mode is activated for a second scrubbing assembly. The controller system 220 may switch the modes such that after a predetermined duration the regeneration mode is activated for the first scrubbing assembly and the scrubbing mode is activated for the second scrubbing assembly. To that end, at least one scrubbing assembly 142 may be activated to operate in a scrubbing mode.

Following the scrubber regeneration mode, in some embodiments, the controller system 220 may activate a cool down mode for allowing the adsorbent material to cool down prior to activating the scrubbing mode.

In FIG. 1C illustrates an economizer mode according to some embodiments. During some embodiments of the economizer mode, outdoor air 130 is introduced into the enclosed environment 102. The economizer mode may be operated upon the conditions of the outdoor air 130 being relatively similar to the desired conditions of the supply air 112. This may occur when the outdoor conditions are such that the enthalpy and/or the humidity and/or the temperature level of the outdoor air 130 is equal to or less than that of the indoor air. In some such embodiments, therefore, the outdoor air 130 which may be introduced into the HVAC system 100 does not require conditioning prior to entering the enclosed environment 102 as supply air 112, and thus, the energy expenditure of the HVAC system 108 is decreased.

The enthalpy and/or the humidity and/or the temperature level the outdoor air 130 and indoor air may be determined in any suitable manner, such as by the temperature and/or humidity sensor 230, sensors measuring pressure, volume and/or energy, for example.

The outdoor air 130 may be introduced into the HVAC system 100 in any suitable manner. In some embodiments, as seen in FIG. 1C, the outdoor air 130 is introduced via an outdoor air inlet 250 at the entrance to the intake ducts 134 for flow via the air handling unit 110. In some embodiments, the outdoor air 130 may enter via an outdoor air inlet and may flow directly to the enclosed environment 102 and bypass the air handling unit 110. In some embodiments, the outdoor air inlet may be associated with the scrubbing assembly 142 and may be integrated therewith (not shown). In some embodiments, the outdoor air inlet may be unassociated with the scrubbing assembly 142 and the intake ducts 134. In some embodiments, wherein an outdoor air intake duct does not exist in HVAC system 100, an intake duct may be installed so as to allow the operation of the economizer mode.

The outdoor air 130 may be urged to flow in the HVAC system 100 in any suitable manner. As seen in FIG. 1C, the outdoor air fan 138 may urge the flow of the outdoor air 130 to the supply air ducts 210. Alternatively, the outdoor air fan 138 may be obviated and the outdoor air 130 may be drawn by low pressure created by the air handling unit 110 to flow thereto or by forcing air out of the HVAC system 100, thereby causing the outdoor air 130 to be drawn therein.

The volume of the portion of outdoor air 130 flowing into the HVAC system 100 may be controlled by the outdoor air damper 136 and the outdoor air fan 138, or by any other suitable means.

During the economizer mode the scrubbing system 140 may be inactive. Accordingly, during the economizer mode the outdoor air damper 136 may be open. The entry damper 168 and exit damper 172 of the scrubbing assembly 142 and the purge gas entry damper 188 and purge gas exit damper 194 may be closed.

In some embodiments, the return air 114 may be exhausted from the HVAC system 100, as exhaust air 124, via exhaust ducts 126 or via any other suitable exhaustion means. In some embodiments, the return air 114 may flow directly to the enclosed environment 102 via ducts 169 and the air handling unit 110 or may bypass the air handling unit 110. Additionally, the return air 114 may flow to another section of the HVAC system 100, such as ducts, a plenum or a manifold (not shown) in the vicinity of the enclosed environment 102. In some embodiments, a portion of the return air 114 may be exhausted and a portion of the return air 114 may flow to the enclosed environment 102 or other location in the HVAC system 100.

Figure 1D:
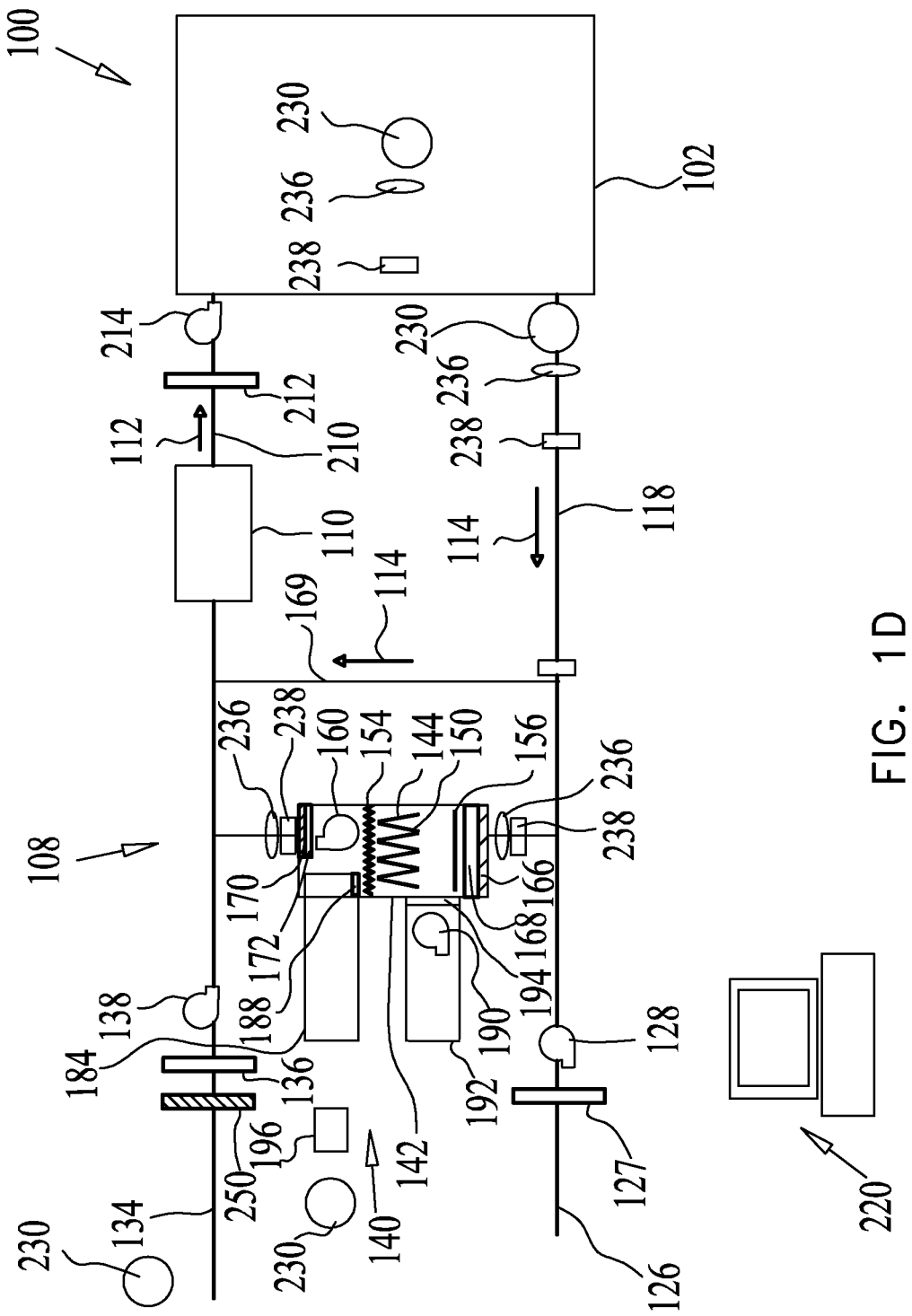

In FIG. 1D, a scrubbing bypass mode is shown. In some embodiments, during the scrubbing bypass mode, the return air 114 is circulated within air circulation system 108 while bypassing the scrubbing system 140. The scrubbing bypass mode may be operated wherein the level of the contaminant present in the indoor air is at or below a threshold level, thus, the indoor air quality is within a desired air quality range. This may occur, for example, when the occupancy within the enclosed environment 102 is relatively low resulting in a relatively low contaminant level.

In some embodiments, the scrubbing bypass mode may also be activated during the scrubber regeneration mode. The scrubbing bypass mode may also be activated, when the level of the contaminant of air exiting the scrubbing system 140 is greater than the level of the contaminant of air entering the scrubbing system 140, which may indicate that the adsorbent material is saturated or malfunctioning of the scrubbing system. Upon the scrubbing system malfunctioning, the controller system 220 may provide an alert comprising at least one of: an alarm, an indicator, a notification, an electronic or telephonic communication.

As seen in FIG. 1D, during the scrubbing bypass mode the return air 114 may be directed to flow to the enclosed environment via ducts 169 to the enclosed environment 102. The return air 114 may flow through the air handling unit 110, as shown in FIG. 1D, or may be directed to bypass the air handling unit 110. During the scrubbing bypass mode, the entry damper 168 and exit damper 172 of the scrubber 142 may be closed.

In some embodiments, the outdoor air damper 136 is closed and the supply air 112 comprises the unscrubbed return air 114, as shown in FIG. 1D. In some embodiments, the outdoor air damper 136 may be opened to allow a minimal level volume of outdoor air 130 or a predetermined amount of outdoor air 130 into the HVAC system 102.

In accordance with some embodiments, the scrubbing system 140, along with the controller system 220, may be added to an existing circulation system 108. In such embodiments, a pre-existing outdoor air inlet 250 may be utilized for introducing outdoor air, or an outdoor air inlet 250 may be installed. Thus, a single system for operating the HVAC system 100 may be easily installable in a pre-existing circulation system 108.

In accordance with some embodiments, the scrubbing system 140 and the controller system 220 may be installed along with a circulation system 108.

Another operative mode according to some embodiments, may be a circulation off or standby mode, where the circulation system 108 or the HVAC system 100 is inactive and air (indoor and/or outdoor) is not circulated. The circulation off or standby mode may be operated upon the occupancy within the enclosed environment 102 is relatively low. This may occur, for example, at nighttime or on weekends.

During the circulation off or standby mode, the entry damper 168 and exit damper 172 of the scrubber 142 may be closed. The purge gas entry damper 188 and purge gas exit damper 194 may be closed. In some embodiments, the outdoor air damper 136 is closed. In some embodiments, the outdoor air damper 136 may be partially opened to allow a minimal level volume of outdoor air 130 or any other predetermined amount of air into the HVAC system 102.

While different operative modes were described in reference to FIGS. 1A-1D, it will be appreciated that some of these modes may be activated together and it is further appreciated that additional operative modes may be selected by the controller system 220. Moreover, in accordance with some embodiments, the controller system 220 may activate non-routine modes suitable for system testing and maintenance or safety interventions, for example.

The HVAC system 100 shown in FIGS. 1A-1D may be a central HVAC system. The central HVAC system generally includes one or more central air handling units, such as air handling unit 110. In the central HVAC system, the air circulation system 108 may be formed with ducts directing the supply air 112 from the central air handling unit to 110 the enclosed environment 102. It is appreciated that the controller system 220 may be utilized in other HVAC system configurations.

In accordance with some embodiments, the HVAC system is a distributed air circulation system. This distributed system generally conveys chilled (or heated) fluid to the plurality of indoor spaces, such as rooms, within the enclosed environment, where local air circulation units, such as fan-coil units circulate the indoor air. The fan-coil unit generally comprises a coil chilled (or heated) by the fluid. The coil is provided for adjusting the temperature or humidity of the circulated air and a fan or blower is provided for circulating the indoor air.

The chilled or heated fluid can originate from a centralized chilling or heating system shared by a plurality of fan-coil units, or from a single dedicated heat pump unit. As known in the art, the fluid can be supplied by a Variable Refrigerant Flow (VRF) system, a Fixed Refrigerant Flow system, or by a direct expansion (DX) system. In other distributed air circulation systems the fluid may be water.

The fan coil unit may be placed within a room or space, e.g., within a recess in the ceiling or walls of the room. The fan coil unit may be placed in a plenum adjacent to the room. The circulating air flows from the air circulation unit into the room substantially without reliance on ducts (i.e. a ductless supply) and back from the room or space towards the air. An exemplary distributed air circulation system is described in reference to FIGS. 2A-2D.

FIGS. 2A-2D are each a simplified schematic illustration of HVAC system 300 for the enclosed environment 102 at different operative modes according to some embodiments. As seen in FIGS. 2A-2D, the HVAC system 300 comprises an air circulation system 308 configured to circulate air of the enclosed environment 102. The air circulation system 308 may comprise any suitable configuration for selectively conditioning air introduced in enclosed environment 102.

Figure 2A:
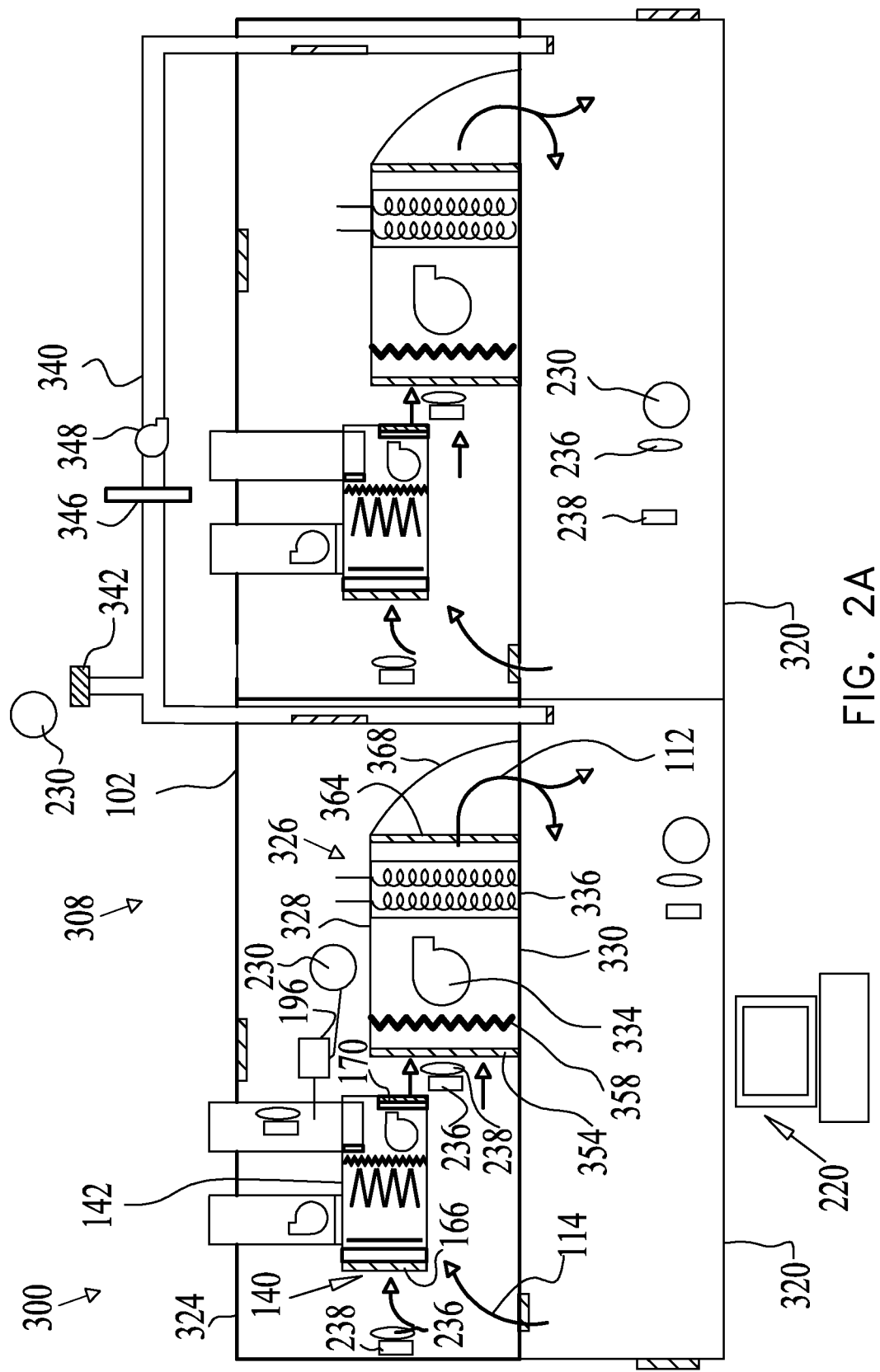
FIGS. 2A, 2B, 2C and 2D are each a simplified schematic illustration of another HVAC system for an enclosed environment at different operative modes, according to some embodiments of the present disclosure.

According to some embodiments, the enclosed environment 102 may comprise a plurality of indoor spaces 320, such as rooms, cubicles, zones in a building, compartments, railroad cars, caravans or trailers, for example. Adjacent to the indoor space 320 may be an air plenum 324, which may be located above the ceiling of the indoor space 320. As seen in FIG. 2A, each indoor space 320 is associated with a separate air plenum 324, though a common air plenum 324 may be associated with a plurality of indoor spaces 320. According to another embodiment, the enclosed environment 102 may comprise a single indoor space 320.

The air circulation system 308 can convey chilled and/or heated fluid to local air circulation units 326. Each indoor space 320 may be associated with a local air circulation unit 326, which circulates and cools or heats the indoor air of the indoor space 320.

In the embodiments, as shown in FIGS. 2A-2D, the air circulation unit 326 comprises a fan-coil unit 328. It is appreciated that the air circulation unit 326 may comprise any other suitable device for circulating and cooling or heating air in indoor spaces 320, such as a blower-coil unit, for example. In some embodiments, the air circulation unit 326 may be a component in a split unit system.

The air circulation unit 326 may be placed at any suitable location. As seen in FIGS. 2A-2D, the air circulation unit 326 may be placed within the plenum 324. In some embodiments, the air circulation unit 326 may be placed within the indoor spaces 320.

The fan-coil unit 328 may comprise a housing 330 including a fan 334 and coils 336. The coils 336 may be cooled or heated by the fluid. The coils 336 may comprise a cooling coil and/or a heating coil and/or any other suitable cooling or heating means, such as radiators, electrical heaters, chillers, heat exchangers, nozzles or jets, for example.

At least a portion of the indoor air may exit the indoor space 320 as return air 114. In accordance with some embodiments, the return air 114 may enter the air plenum 324. The return air 114 can enter the air plenum 324 without flowing through a duct, though in some embodiments, a duct (not shown) may be provided.

In accordance with other embodiments, the indoor space 320 may be associated with an adjacent area above its ceiling instead of the air plenum 324. The return air 114 may flow within a duct (not shown) located in the area above the ceiling to the fan-coil unit 328.

The fan 334 may draw return air 114 to enter fan-coil unit 328, via an entry port 354, and flow in the vicinity of coils 336 for heating or cooling thereof. Return air 114 may flow through a particle filter 358 for removing dust and airborne particles therefrom.

Conditioned air, i.e., return air cooled or heated by the coils 336, may exit via an exit port 364. The conditioned air may enter the indoor space 320 as supply air 112 for circulation thereof. The supply air 112 may flow from the fan-coil unit 328 into the indoor space via a duct 368 or may ductlessly flow into the indoor space 320.

In some embodiments, a portion of the indoor air may be exhausted from the enclosed environment 102 as exhaust air 124 (FIG. 2C) into the ambient or any location outside the enclosed environment 102. Any suitable means, such as a blower or a fan (not shown) may be used to exhaust the exhaust air 124. The exhaust air 124 may exit via the indoor space 320, may exit via the air plenum 324 and/or via the fan-coil unit 328 (not shown).

Figure 2B:
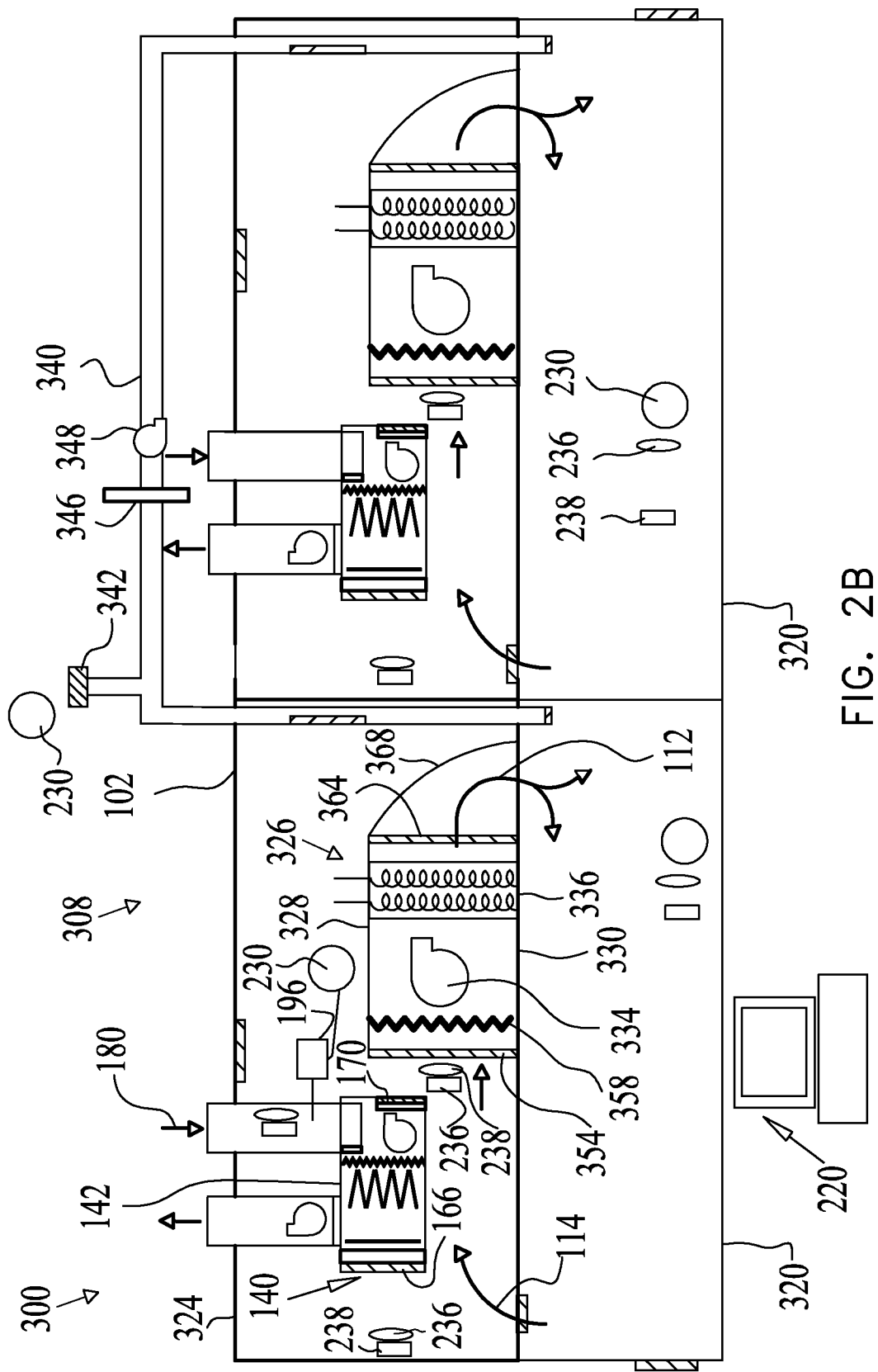
Figure 2C:
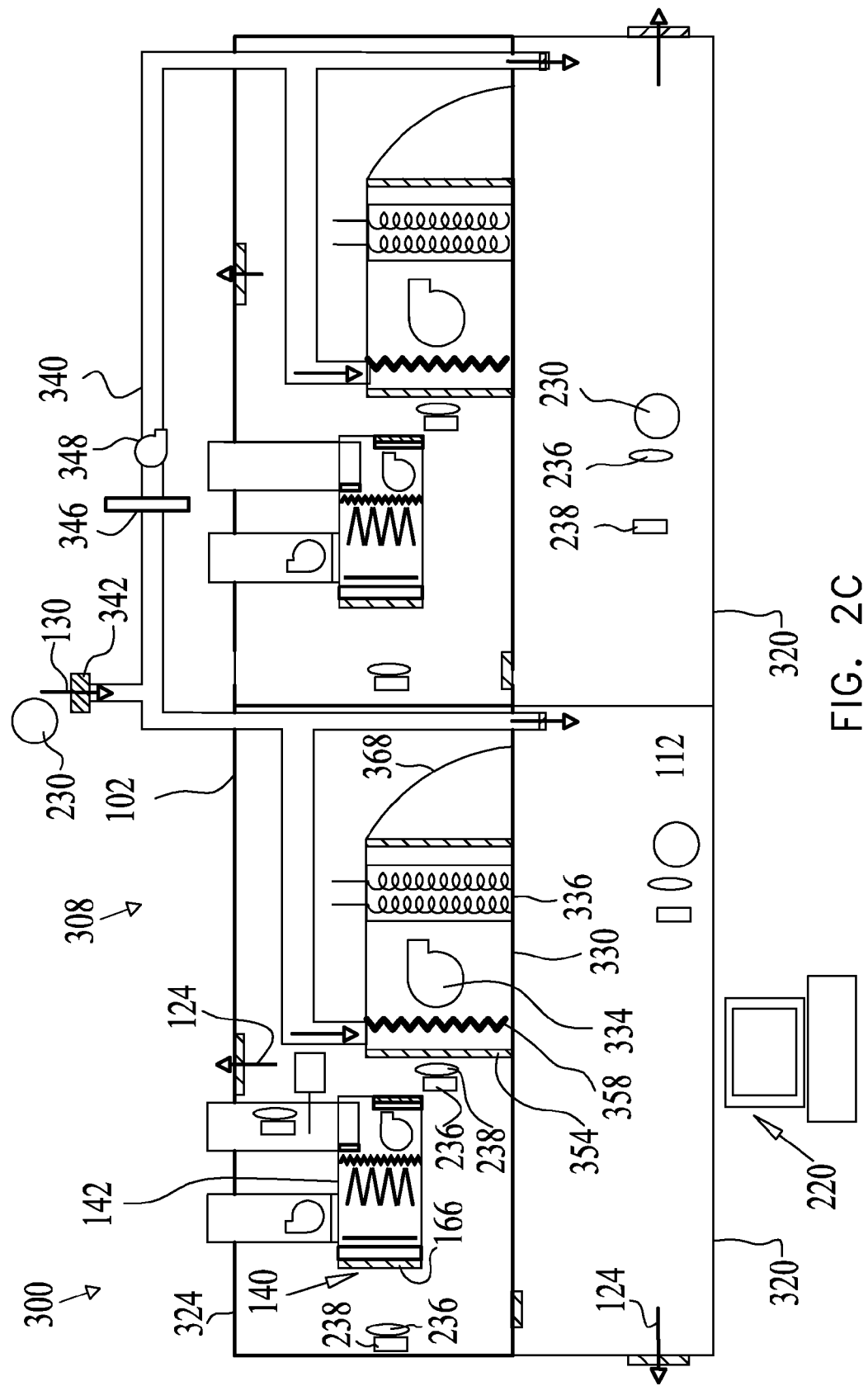

As shown in FIG. 2C, outdoor air 130 may be introduced into the enclosed environment 102 for supplying nominally fresh, good quality air. The outdoor air 130 may be introduced into the enclosed environment in any suitable manner, such as by intake ducts 340 via an outdoor inlet 342. In the embodiment shown in FIGS. 2A-2D the outdoor air 130 may be introduced directly into each of the indoor spaces 320. In some embodiments, the outdoor air 130 may be introduced directly into each fan-coil unit 328 as shown in FIG. 2C. In some embodiments, the outdoor air 130 may be introduced into the air plenum 324 (not shown).

The volume of the portion of outdoor air 130 flowing into the HVAC system 300 may be controlled by an outdoor air damper 346 and an outdoor air fan 348, or by any other suitable means. The outdoor air damper 346 and outdoor air fan 348 may be placed at any suitable location, such as along intake ducts 340.

As shown in FIG. 2A, the scrubbing system 140 is provided to reduce the concentration of contaminants present in the return air 114 flowing therein.

In some embodiments, scrubbing the return air 114 within the scrubbing system 140 allows reducing or eliminating the volume of fresh, outdoor air 130, which is required to provide for maintaining good air quality within the enclosed environment 102. Accordingly, the energy required to condition the outdoor air 130 is reduced or eliminated.

In accordance with some embodiments, the controller system 220 is provided for controlling the operation of the air circulation system 308 and the scrubbing system 140 for selecting a preferred mode for maintaining good air quality within the enclosed environment 102 with the lowest energy expenditure of the HVAC system 300.

In accordance with some embodiments, the temperature and/or humidity sensor 230 may be placed within the indoor space 320 for measuring the temperature and/or humidity within the indoor air of the enclosed environment 102 and may be placed out of the enclosed environment 102 for measuring the temperature and/or humidity within the outdoor air 130 in the ambient. Additionally, the temperature and/or humidity sensor 230 may be provided to measure the temperature and/or humidity of heater 196. Other sensors for measuring the pressure, volume and/or energy may be provided for determining the abovementioned parameters.

Contaminant sensors, such as the $CO_2$ sensor 236, the VOC sensor 238 and/or any other contaminant sensors, may be placed within the indoor air of the enclosed environment 102 to measure the contaminant level therein. One or more contaminant sensors may be placed at any suitable location, such as within the indoor space 320.

Contaminant sensors may be placed within the scrubbing system 140 for measuring the level of contaminants in the adsorbent material within the scrubbing assembly 142. The contaminant sensors may be placed at any suitable location within the scrubbing system 140, such as in proximity to the entry port 166 of at least one scrubbing assembly 142 and/or to the exit port 170 therefrom. The level of contaminants in the adsorbent material may be determined by comparing the level of contaminants measured in the air at the exit port 170 to the level of contaminants measured in the air at the entry port 166.

In some embodiments, the scrubbing system 140 comprises a plurality of scrubbing assemblies 142 the contaminant sensors may be placed at an entry port and exit port of scrubbing system 140 or at the entry port and exit port of a least some of the scrubbing assemblies 142.

The controller system 220 may receive any other additional data for controlling the operation of the air circulation system 308 and the scrubbing system 140. For example, the HVAC system settings, such as the time, such as the time of day, date and operation schedule may be provided. Additionally, signals from pressure gauges, air flow meters of the return air 114 circulating in the circulation system and/or of the outdoor air 130 may be received by the controller system 220. Moreover, data may be received from components within the HVAC system 300, such as the temperature, humidity, pressure or flow rate, and energy expenditure of the HVAC refrigerant, the chilled or heated fluid, chiller, compressor, fan-coil unit 328 and/or heat pump, for example.

In FIGS. 2A-2D illustrate different exemplary operative modes according to some embodiments.

In FIG. 2A, a scrubbing mode is shown according to some embodiments. During the scrubbing mode, a portion of the return air 114 flows into the scrubbing assembly 142 of the scrubbing system 140. The scrubbed air flows into the fan-coil unit 328 and may be conditioned by being cooled or heated therein. The supply air 112 may flow from the fan-coil unit 128 into the indoor space 320. The scrubbing mode may be operated as described in reference to FIG. 1A, mutatis mutandis.

In FIG. 2B a scrubber regeneration mode is shown according to some embodiments. During the scrubber regeneration mode, purge gas 180 may flow into the scrubbing assembly 142 of the scrubbing system 140 or the regeneration may be performed in any suitable manner. The scrubber regeneration mode may be operated as described in reference to FIG. 1B, mutatis mutandis.

Following the scrubber regeneration mode, in some embodiments, the controller system 220 may activate a cool down mode for allowing the adsorbent material to cool down prior to activating the scrubbing mode.

In FIG. 2C, an economizer mode is shown according to some embodiments. During the economizer mode outdoor air 130 is introduced into the enclosed environment 102. The economizer mode may be operated as described in reference to FIG. 1C, mutatis mutandis.

The outdoor air 130 may be introduced into the HVAC system 300 in any suitable manner. In some embodiments, as seen in FIG. 2C, the outdoor air 130 is introduced via the outdoor air inlet 342 at the entrance to the intake ducts 340 for flow into enclosed environment 102. In some embodiments, the outdoor air inlet may be associated with the scrubbing assembly 142 and may be integrated therewith (not shown). In some embodiments, the outdoor air inlet may be unassociated with the scrubbing assembly 142 and the intake ducts 340. In some embodiments, wherein an outdoor air intake duct does not exist in HVAC system 300, an intake duct may be installed so as to allow the operation of the economizer mode.

Figure 2D:
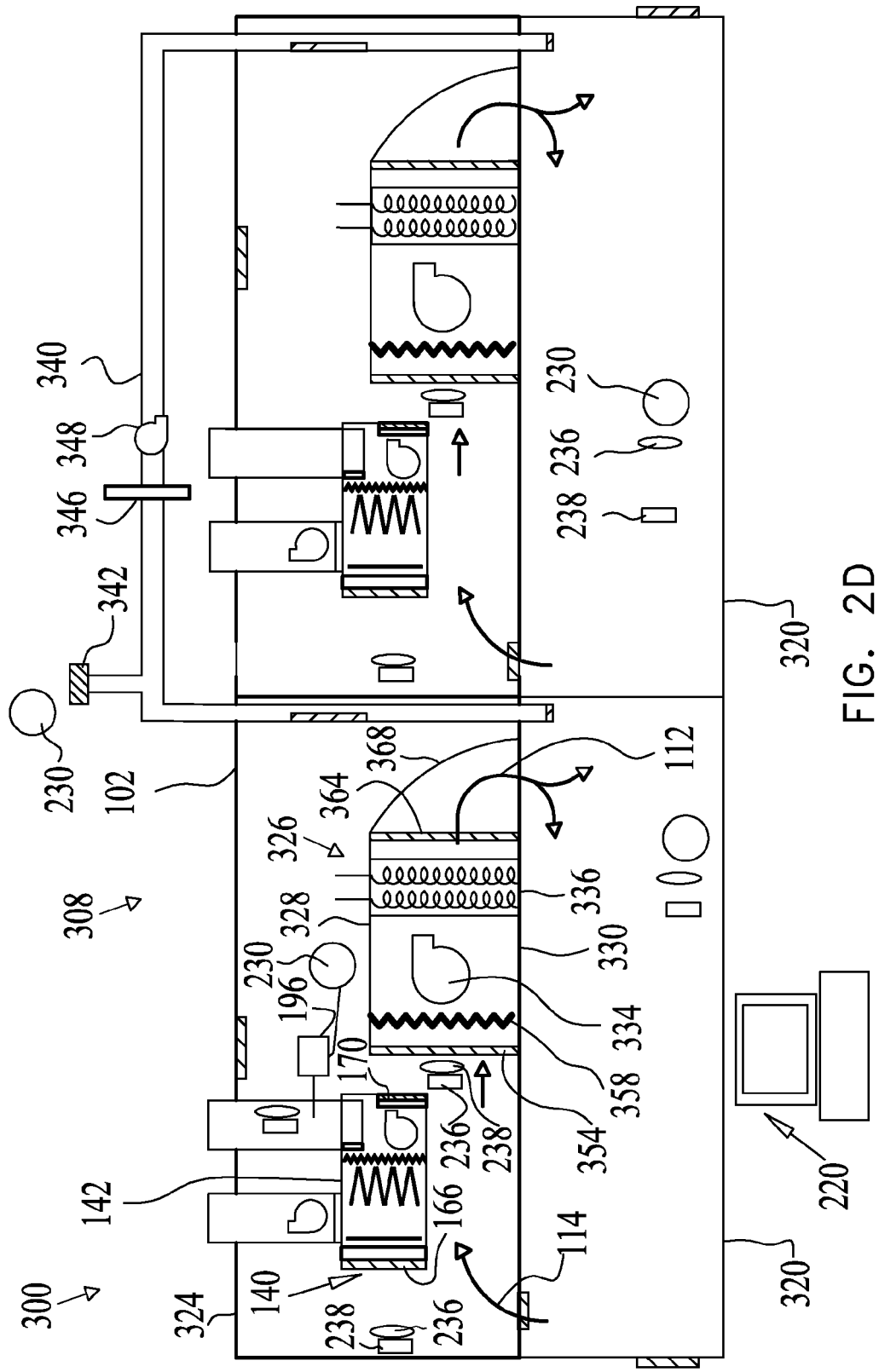

In FIG. 2D a scrubbing bypass mode is shown according to some embodiments. During the scrubbing bypass mode, the return air 114 is circulated within air circulation system 108 while bypassing the scrubbing system 140. The scrubbing bypass mode may be operated as described in reference to FIG. 1D, mutatis mutandis.

In accordance with some embodiments, the scrubbing system 140, along with the controller system 220, may be added to an existing circulation system 308. In such embodiments, the pre-existing outdoor air inlet 342 may be utilized for introducing outdoor air, or an outdoor air inlet 342 may be installed. Thus, a single system for operating the HVAC system 300 may be easily installable in a pre-existing circulation system 308.

In accordance with some embodiments, the scrubbing system 140 and the controller system 220 may be installed along with a circulation system 308.

Another operative mode, according to some embodiments, may be a circulation off or standby mode, where the circulation system 308 or the HVAC system 300 is inactive and air (indoor and/or outdoor) is not circulated therein. The circulation off or standby mode may be operated as described hereinabove in reference to HVAC system 100, mutatis mutandis.

Different operative modes according to various embodiments were described in reference to FIGS. 2A-2D. It will be appreciated by one of skill in the art that some of these modes may be activated together, and it is further appreciated that additional operative modes may be selected by the controller system 220. To that end, in accordance with some embodiments, the controller system 220 may activate non-routine modes suitable for system testing and maintenance or safety interventions, for example.

In accordance with some embodiments, the scrubbing system 140 may be provided independently in respect to the circulation system 108. The scrubber 142 may be located in any suitable location, such as within the enclosed environment 102. The scrubber 124 may be mounted at a window (not shown), on the floor, on the wall or at the ceiling of the enclosed environment 102, for example.

An exemplary independent scrubbing system 140 in association with a central HVAC system is described in reference to FIGS. 3A-3D. FIGS. 3A-3D are each a simplified schematic illustration of HVAC system 380 for the enclosed environment 102 at different operative modes according to some embodiments. As seen in FIGS. 3A-3D, the HVAC system 380 comprises the air circulation system 108 configured to circulate air of the enclosed environment 102.

In accordance with some embodiments, the controller system 220 controls the operation of the air circulation system 108 and the scrubbing system 140 for selecting a preferred mode for maintaining good air quality within the enclosed environment 102 with the lowest energy expenditure of the HVAC system 380.

In accordance with some embodiments, the temperature and/or humidity sensor 230 may be placed within the enclosed environment 102 for measuring the temperature and/or humidity therewithin and may be placed out of the enclosed environment 102 for measuring the temperature and/or humidity within the outdoor air 130 in the ambient. Additionally, the temperature and/or humidity sensor 230 may be provided to measure the temperature and/or humidity of heater 196 (FIG. 3B). Other sensors for measuring the pressure, volume and/or energy may be provided for determining the abovementioned parameters.

One or more contaminant sensors, such as the $CO_2$ sensor 236, the VOC sensor 238 and/or any other contaminant sensors, may be placed within the enclosed environment 102 to measure the contaminant level therein.

Contaminant sensors may be placed within the scrubbing system 140 for measuring the level of contaminants in the adsorbent material within the scrubbing assembly 142. The contaminant sensors may be placed at any suitable location within the scrubbing system 140, such as in proximity to the entry port 166 of at least one scrubbing assembly 142 and/or to the exit port 170 therefrom (such as shown in FIGS. 1A-1D). The level of contaminants in the adsorbent material may be determined by comparing the level of contaminants measured in the air at the exit port 170 to the level of contaminants measured in the air at the entry port 166.

In some embodiments, the scrubbing system 140 may comprise a plurality of scrubbing assemblies 142 the contaminant sensors may be placed at an entry port and exit port of scrubbing system 140 or at the entry port and exit port of a least some of the scrubbing assemblies 142.

In some embodiments, the controller system 220 may receive other additional data for controlling the operation of the air circulation system 108 and the scrubbing system 140. For example, the HVAC system settings, such as the time, such as the time of day, date and operation schedule, may be provided. Additionally, signals from pressure gauges, air flow meters of the return air 114 circulating in the circulation system and/or of the outdoor air 130 may be received by the controller system 220. Moreover, data may be received from components within the HVAC system 380, such as the temperature, humidity, pressure or flow rate, and energy expenditure of the HVAC refrigerant, the chilled or heated fluid, chiller, compressor, air handling unit 110 and/or heat pump, for example.

Figure 3A:
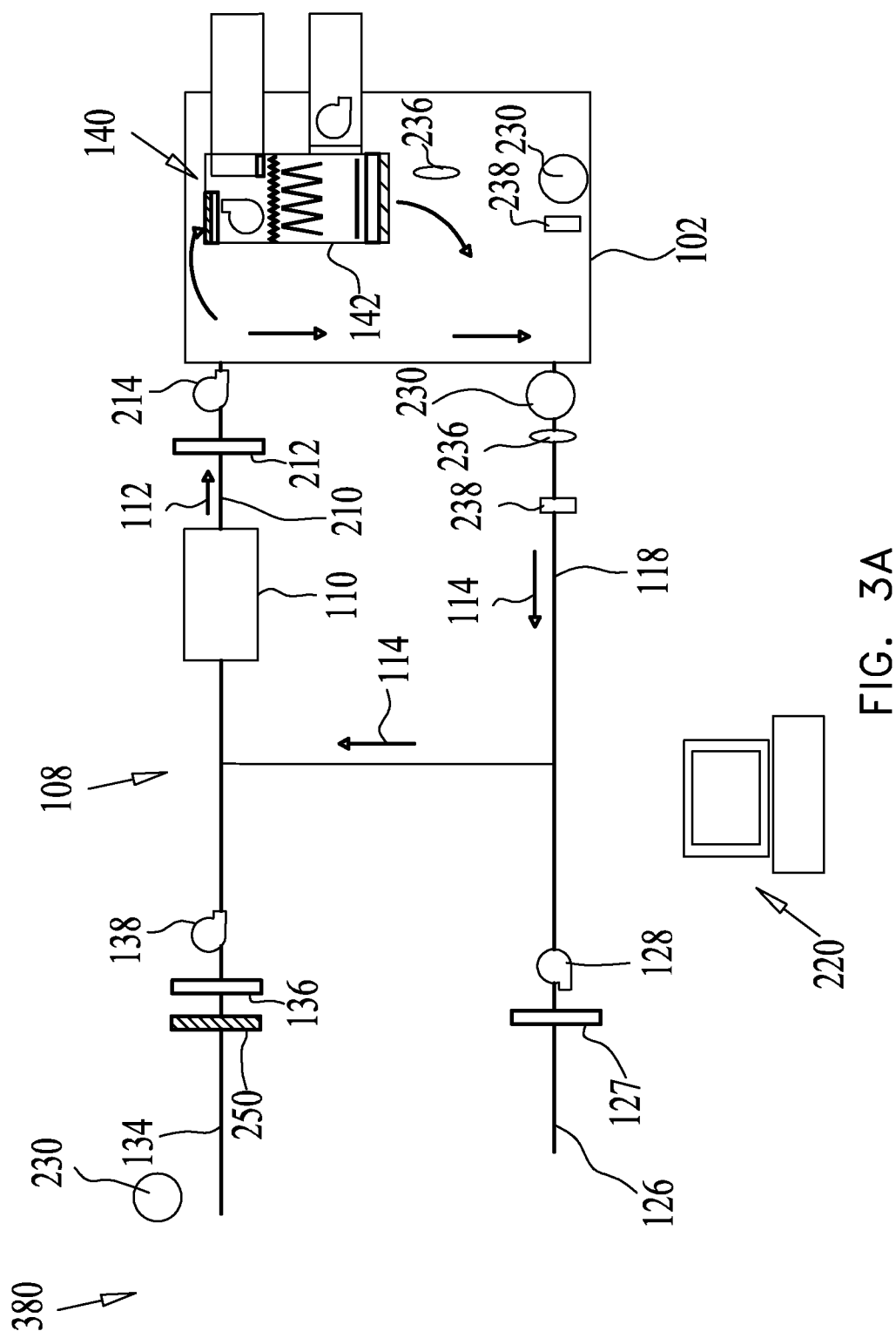
FIGS. 3A, 3B, 3C and 3D are each a simplified schematic illustration of yet another HVAC system for an enclosed environment at different operative modes, according to some embodiments of the present disclosure.
Figure 3B:
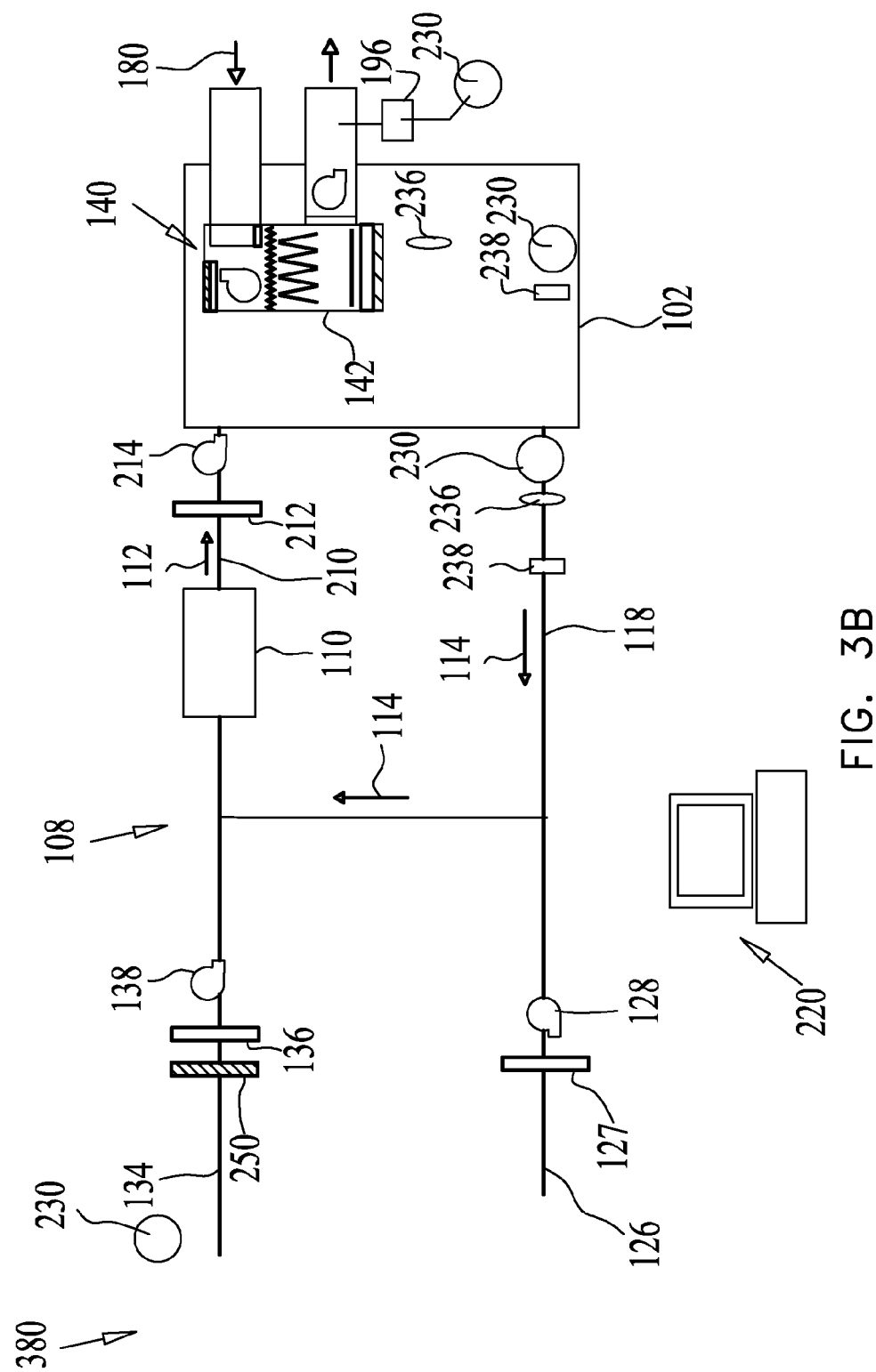

In FIGS. 3A-3D different exemplary operative modes are shown according to some embodiments. In FIG. 3A, a scrubbing mode is shown. During the scrubbing mode, at least a portion of the indoor air flows into the scrubbing assembly 142 of the scrubbing system 140. The portion of scrubbed air along with the unscrubbed air may flow to the air handling unit 110 for conditioning thereof and thereafter may be supplied as supply air 112 to the enclosed environment 102. The scrubbing mode may be operated as described in reference to FIG. 1A, mutatis mutandis.

In FIG. 3B, a scrubber regeneration mode is shown according to some embodiments. During the scrubber regeneration mode, purge gas 180 may flow into the scrubbing assembly 142 of the scrubbing system 140, and/or the regeneration may be performed in any suitable manner. The scrubber regeneration mode may be operated as described in reference to FIG. 1B, mutatis mutandis.

Following the scrubber regeneration mode, in some embodiments, the controller system 220 may activate a cool down mode for allowing the adsorbent material to cool down prior to activating the scrubbing mode.

Figure 3C:
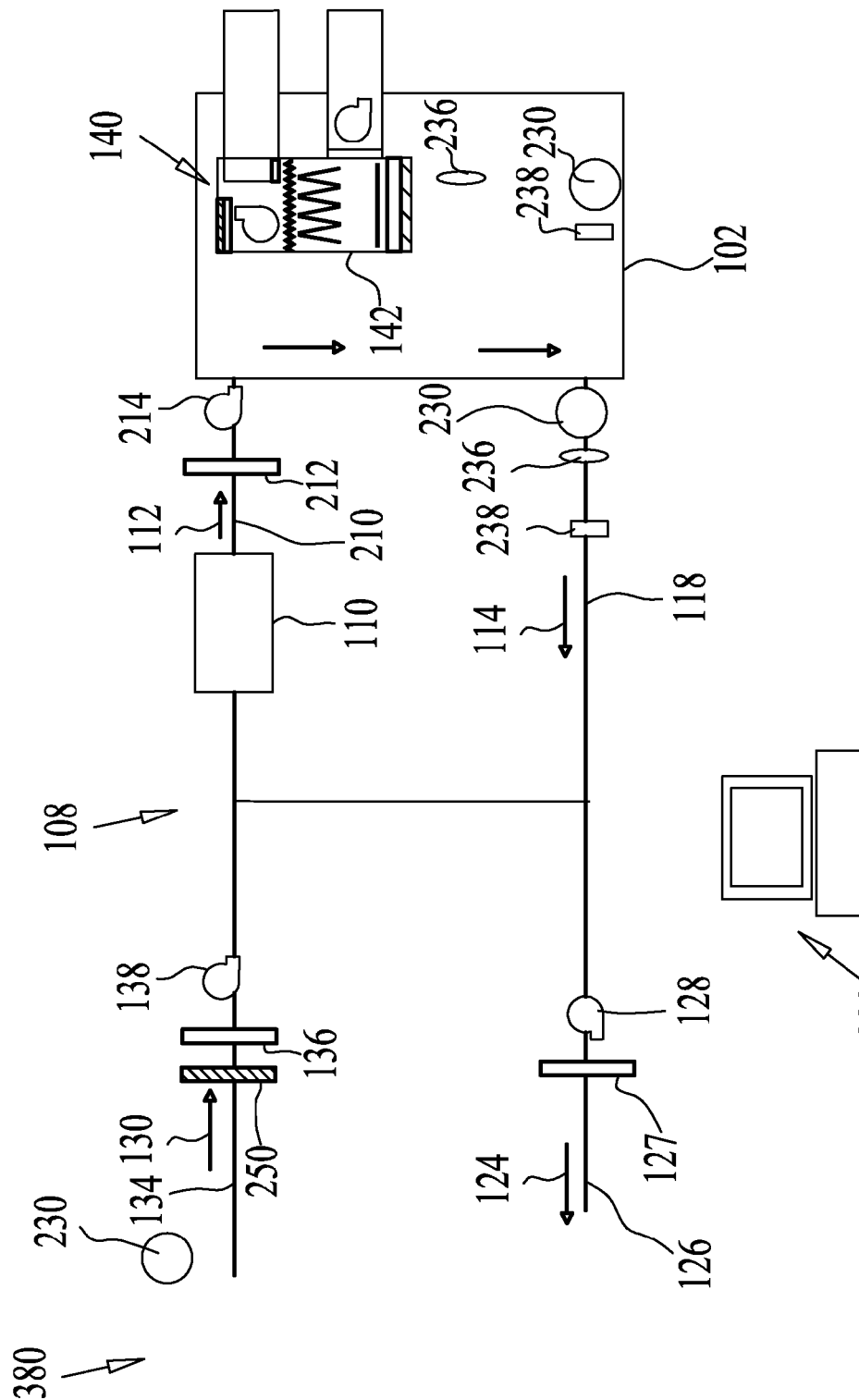

In FIG. 3C an economizer mode is shown according to some embodiments. During the economizer mode, outdoor air 130 is introduced into the enclosed environment 102, and may be operated as described in reference to FIG. 1C, mutatis mutandis.

The outdoor air 130 may be introduced into the HVAC system 380 in any suitable manner. In some embodiments, as seen in FIG. 3C, the outdoor air 130 is introduced via the outdoor air inlet 250 at the entrance to the intake ducts 134 for flow into enclosed environment 102. In some embodiments, the outdoor air inlet may be associated with the scrubbing assembly 142 and may be integrated therewith (not shown). In some embodiments, the outdoor air inlet may be unassociated with the scrubbing assembly 142 and the intake ducts 134. In some embodiments, wherein an outdoor air intake duct does not exist in HVAC system 380, an intake duct may be installed so as to allow the operation of the economizer mode.

Figure 3D:
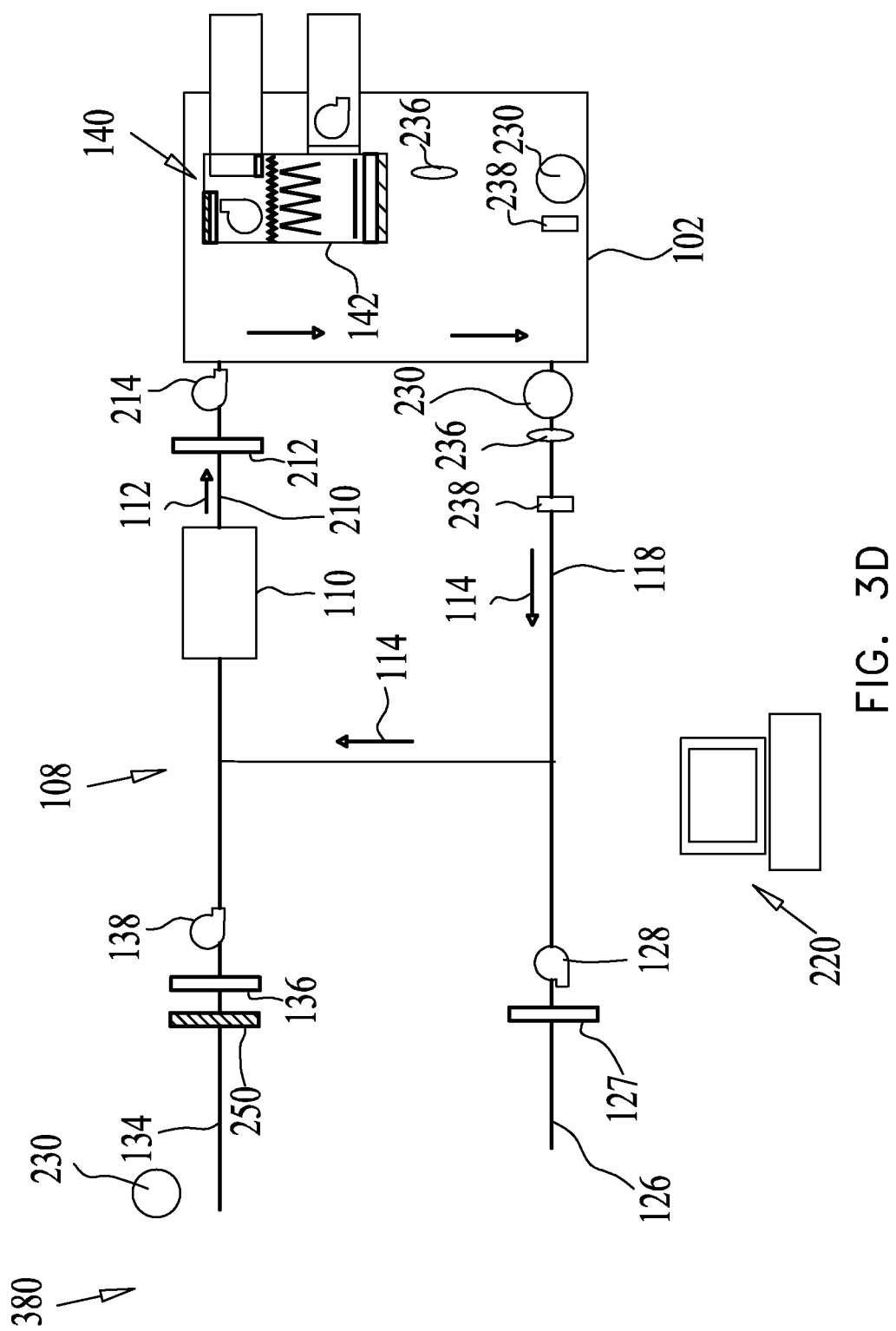

In FIG. 3D a scrubbing bypass mode is shown according to some embodiments. During the scrubbing bypass mode, the return air 114 is circulated within air circulation system 108 while bypassing the scrubbing system 140. The scrubbing bypass mode may be operated as described in reference to FIG. 1D, mutatis mutandis.

In accordance with some embodiments, the scrubbing system 140, along with the controller system 220, may be added to an existing circulation system 108. In such embodiments, the pre-existing outdoor air inlet 250 may be utilized for introducing outdoor air, or an outdoor air inlet 250 may be installed. Thus, a single system for operating the HVAC system 100 may be easily installable in a pre-existing circulation system 108.

In accordance with some embodiments, the scrubbing system 140 and the controller system 220 may be installed along with a circulation system 108.

Another mode, according to some embodiments, may be a circulation off or standby mode, where the circulation system 108 or the HVAC system 380 is inactive and air (indoor and/or outdoor) is not circulated. The circulation off or standby mode may be operated as described hereinabove in reference to HVAC system 380, mutatis mutandis.

Different operative modes according to some embodiments were described in reference to FIGS. 3A-3D. It will be appreciated that some of these modes may be activated together and it is further appreciated that additional operative modes may be selected by the controller system 220. In accordance with some embodiments, the controller system 220 may activate non-routine modes suitable for system testing and maintenance or safety interventions, for example.

It is noted in reference to FIGS. 1A-3D, that any other suitable means besides dampers, such as valves, fans or shutters, may be used to control the volume of air entering and/or exiting the scrubbing system 140 and the circulation system 108 of FIGS. 1A-1D or 3A-3D or the circulation system 308 of FIGS. 2A-2D. Additionally, blowers or any other suitable means for urging flow of air may be used in place of or in addition to the fans of the scrubbing system 140 and the circulation system 108 of FIGS. 1A-1D or 3A-3D or the circulation system 308 of FIGS. 2A-2D. For example, the HVAC system 100 may be structured with low pressure locations for drawing air thereto from a higher pressure location. Such a low pressure location may be, for example, the air handling unit 110 of FIGS. 1A-1D, which may draw outdoor air 130 thereto.

Figure 4A:
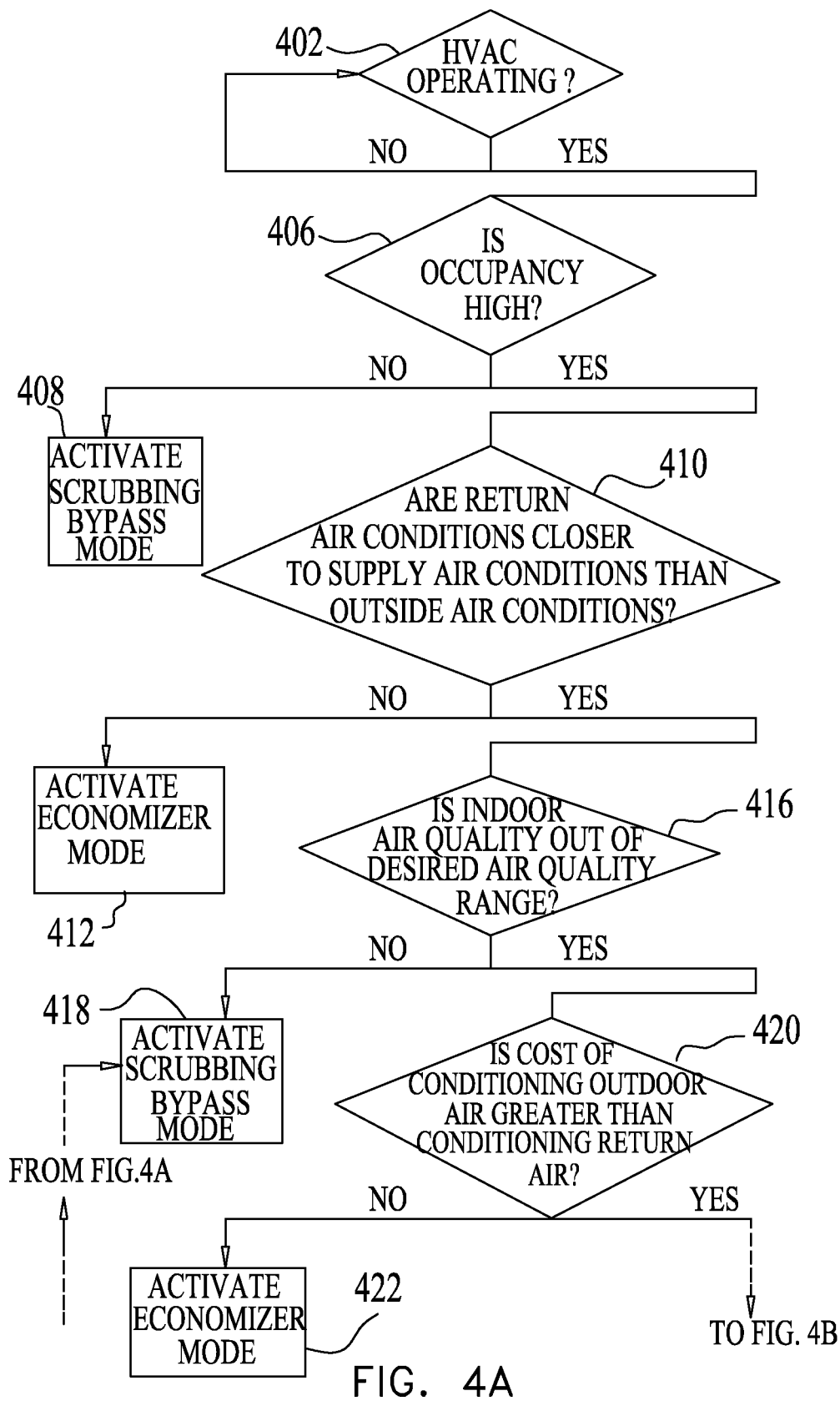
FIGS. 4A and 4B together are a flowchart illustrating is an exemplary method for controlling the operation of the air circulation system and the scrubbing system of the HVAC systems of FIGS. 1A-1D, FIGS. 2A-2D or FIGS. 3A-3D.
Figure 4B:
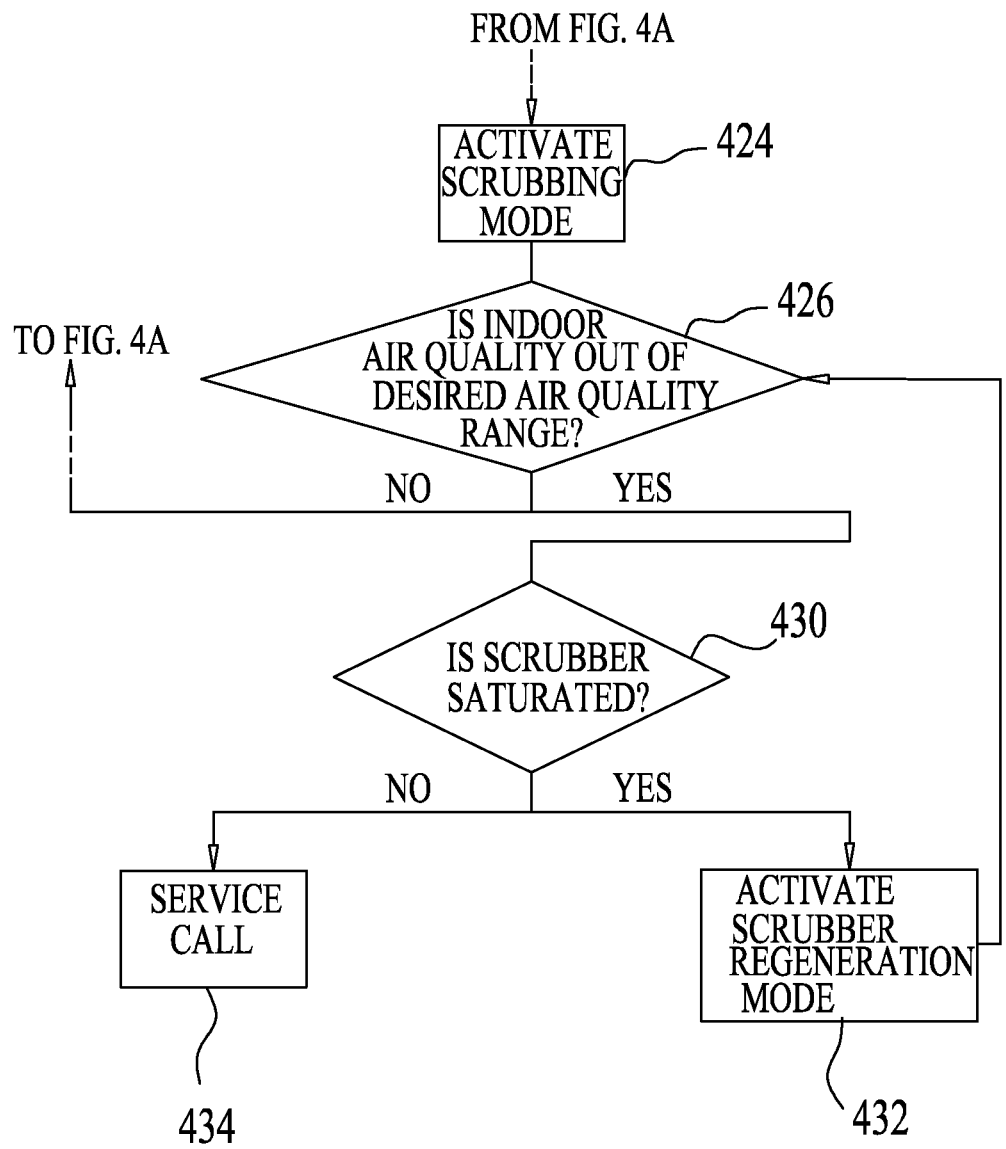

FIGS. 4A and 4B together are a flowchart illustrating is an exemplary method, according to some embodiments, for controlling the operation of the air circulation system and the scrubbing system of the HVAC systems of FIGS. 1A-1D or FIGS. 2A-2D or FIGS. 3A-3D. Turning to FIG. 4A, it is seen that at initial step 402 the controller system 220 proceeds its operation wherein the HVAC system is not in circulation off or standby mode. Wherein the HVAC system, such as HVAC systems 100, 300 or 380 of respective FIGS. 1A-1D, 2A-2D and 3A-3D, is operating, the controller system 220 may proceed to the next step 406.

At step 406, the controller system 220 may check the occupancy of the enclosed environment 102. Wherein the occupancy level is at or below a predetermined number of people the scrubbing bypass mode shown in step 408 may be activated.

If the occupancy level is high, the controller system 220 may further asses, in step 410, if the return air conditions are closer to the supply air conditions than the outdoor air conditions. If the conditions of the outdoor air 130 are relatively similar to the desired conditions of the supply air 112, the economizer mode may be activated, as shown in step 412.

Upon the conditions of the return air 114 are relatively similar to the desired conditions of the supply air 112, the controller system 220 may check the indoor air quality, as shown in step 416.

When the indoor air quality is within a desired air quality range, namely the air quality is good, the scrubbing bypass mode may be activated, as shown in step 418. If the indoor air quality is out of the desired air quality range, the controller system 220 may compare the cost of conditioning the outdoor air 130 with the cost of conditioning the return air 114 in step 420. If the cost for conditioning the outdoor air 130 is less than the return air 114, then the controller system 220 may activate the economizer mode in step 422. If the cost for conditioning the outdoor air 130 is greater than the cost for conditioning the return air 114, the controller system 220 may activate the scrubbing mode in step 424.

The controller system 220 may periodically or continually check the indoor air quality in step 426 to control the duration of the scrubbing mode. If the indoor air quality is within the desired air quality range the controller system 220 may activate the scrubbing bypass mode and further proceed from step 418. If the indoor air quality is out of the desired air quality range, the controller system 220 may check the saturation level of the adsorbent material of the scrubber 142, as seen in step 430. The saturation level may be determined by checking the level of a contaminant in the adsorbent material.

A finding that the contaminant level in the adsorbent material is above the contaminant predetermined threshold may indicate that the adsorbent material is saturated and the scrubber regeneration mode may be operated at step 432. Accordingly, the scrubber regeneration mode may be operated for a period of time in accordance with various embodiments, as described in reference to FIG. 1B. The controller system 220 may periodically or continually check the indoor air quality in step 426 to control the duration of the scrubber regeneration mode.

Where a contaminant level in the adsorbent material is found to be below the contaminant predetermined threshold while the indoor air quality is out of the desired air quality range (step 426), this may indicate that the scrubbing system 140 has malfunctioned and a service call is required, as seen in step 434, or any other suitable action for rectifying the malfunctioning of scrubbing system 140. During the scrubbing system malfunction, the scrubbing bypass mode may be activated and a determined amount of outdoor air 130 may be introduced into the enclosed environment 102.

Example embodiments of the methods and components of the current subject matter have been described herein. As noted elsewhere, these example embodiments have been described for illustrative purposes only, and are not limiting. To that end, other embodiments are possible and are covered by the current disclosed subject matter. Such embodiments will be apparent to persons skilled in the relevant art(s) based on the teachings contained herein. Moreover, a feature(s) from one embodiment(s) may be used in combination or in place of a feature(s) of another embodiment(s). Thus, the breadth and scope of the current subject matter should not be limited by any of the above-described exemplary embodiments. To that end, the following claims, and their equivalents, include a scope covering at least some of the disclosed embodiments.

What is claimed is:

1. An HVAC system, comprising:
    a fan-coil unit configured for arrangement adjacent to or within an enclosed space and to at least one of heat and cool a first airflow from indoor air in the enclosed space;
    a scrubbing system including an adsorbent material to reduce presence of at least one gas contaminant in the indoor air; and
    a controller system configured for controlling at least an operation of the scrubbing system, the controller system configured to operate in two or more of at least the following modes:
        a scrubbing mode configured to cause scrubbing of the at least one gas contaminant from the indoor air;
        a regeneration mode configured to cause regeneration of the adsorbent material;
        an economizer mode configured to cause introduction of a second air from outside the enclosed environment space;
        a scrubbing bypass mode, configured to cause bypassing of wherein circulated air bypasses the scrubbing system and/or the scrubbing system is turned off; and
        a standby mode, wherein the indoor air is not circulated; and
    at least one sensor and/or at least one input for receiving information for determining at least one of the following parameters:
        an occupancy level of the enclosed environment space;
        a level of the at least one contaminant in the indoor air;
        a level of the at least one contaminant in the adsorbent material;
        a level of the at least one contaminant in air exiting the adsorbent material;
        at least one of an indoor air temperature and an indoor air humidity level;
        at least one of an outdoor air temperature and an outdoor air humidity level; and
        at least one of a time and a date the HVAC system is operating;
    wherein:
        the controller system controls activation of the fan-coil unit and the scrubbing system according to the operative modes based upon the at least one parameter determined by the at least one sensor and/or at least one input, and
        upon a level of the at least one gas contaminant in air exiting the scrubbing system being greater than a level of the at least one gas contaminant in air entering the scrubbing system, the scrubbing bypass mode is activated.

2. The system of claim 1, wherein the fan-coil unit is supplied a refrigerant or heating fluid from a Variable Refrigerant Flow (VRF) system.

3. The system of claim 1, further comprising an outdoor air inlet for introducing at least a portion of outdoor air into the enclosed environment space, the outdoor air being from outside the enclosed environment space.

4. The system of claim 1, wherein flow of the indoor air from the indoor space to the fan-coil unit or from the fan-coil unit to the indoor space is ductless.

5. The system of claim 1, wherein the level of the at least one gas contaminant in the adsorbent material is determined based on the level of the at least one gas contaminant in air exiting the scrubbing system to the level of the at least one gas contaminant in air entering the scrubbing system.

6. The system of claim 1, wherein the fan-coil unit is configured to at least one of heat and cool indoor air without introducing outdoor air into the indoor space.

7. The system of claim 1, wherein the scrubber regeneration mode comprises flowing a purging airflow over the adsorbent material so as to eliminate at least a portion of the at least one gas contaminate contaminant held by the adsorbent material.

8. The system of claim 1, wherein the economizer mode comprises introducing into the enclosed environment space at least a portion of outdoor air to reduce an amount of recirculated indoor air required to be conditioned or treated.

9. The system of claim 1, wherein the fan-coil unit includes a housing, the housing including a fan and one or more of a cooling coil, a heating coil, a radiator, an electrical heater, a chiller and a heat exchanger.

* * * * *